US012338661B2

(12) United States Patent
Lynch et al.

(10) Patent No.: US 12,338,661 B2
(45) Date of Patent: Jun. 24, 2025

(54) DETACHING A SECURITY TAG FROM AN ARTICLE WITH A MAGNETIC DETACHER HAVING A MOVABLE BLOCKER

(71) Applicant: Sensormatic Electronics, LLC, Boca Raton, FL (US)

(72) Inventors: Robert K. Lynch, Greenacres, FL (US); Sergio M. Perez, Lake Worth, FL (US); Andrew J. Proulx, Boca Raton, FL (US); Michael del Busto, Lake Worth, FL (US); Channing E. Miller, Fort Lauderdale, FL (US); Jose D. Garzon, Tamarac, FL (US); Charles T. Turgeon, Lighthouse Point, FL (US); Danhui Luo, Lake Worth, FL (US); Marco R. Grimaldo, Boca Raton, FL (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 0 days.

(21) Appl. No.: 17/848,003

(22) Filed: Jun. 23, 2022

(65) Prior Publication Data

US 2023/0417084 A1 Dec. 28, 2023

(51) Int. Cl.
*E05B 73/00* (2006.01)
*G08B 13/19* (2006.01)

(52) U.S. Cl.
CPC .......... *E05B 73/0052* (2013.01); *G08B 13/19* (2013.01)

(58) Field of Classification Search
CPC ............................ E05B 73/0052; G08B 13/19
See application file for complete search history.

(56) References Cited

U.S. PATENT DOCUMENTS

2009/0229327 A1 9/2009 Valade et al.
2015/0187150 A1 7/2015 Favier et al.
2021/0110688 A1* 4/2021 Udumalagala ..... G08B 13/2411

FOREIGN PATENT DOCUMENTS

DE 202021105800 U1 11/2021
WO 2005059467 A1 6/2005

OTHER PUBLICATIONS

International Search Report and Written Opinion issued in International Application No. PCT/US2023/066507 dated Aug. 29, 2023.

* cited by examiner

*Primary Examiner* — Rick K Chang
(74) *Attorney, Agent, or Firm* — ArentFox Schiff LLP

(57) ABSTRACT

The present aspects include a method of detaching a security tag from an article, including receiving, at a detacher device, an unlock signal from a transaction system. The detacher device includes a housing having a nest configured to receive a security tag, a gate assembly including a gate member movable between a closed position that blocks the nest and an open position, and a magnet positioned on an opposite the nest and having a magnetic flux sufficient to unlock a magnetic lock of the security tag. The method further includes moving the gate member from the closed position to the open position based on receipt of the unlock signal, receiving the security tag in the nest, and unlocking the magnetic lock of the security tag to allow the security tag to be detached from the article.

17 Claims, 28 Drawing Sheets

DETACHING A SECURITY TAG FROM AN ARTICLE WITH A MAGNETIC DETACHER HAVING A MOVABLE BLOCKER

TECHNICAL FIELD

The present disclosure generally relates to electronic security systems for securing products, and more particularly to a magnetic detacher, with a movable blocker, for unlocking a lock of an electronic security tag, and method of using the magnetic detacher.

BACKGROUND

Electronic article security tags are used to by merchants to secure products from theft and/or to track products. Such security tags typically include a locking mechanism that may be unlocked by the merchant by placing the locking mechanism near a magnetic detacher system having a relatively strong magnetic field. Magnetic detacher systems which utilize such a magnetic tag detaching mechanism generally lack necessary security measures to ensure unauthorized use of the system. Further, with increased reliance on self-checkout systems, there is a need for improvement in magnetic detacher systems for electronic article security tags.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to one example, the present aspects include a magnetic detacher device, which includes an automated blocker. The magnetic detacher device is connected to a transaction device, which processes transactions of articles which may have security tags. A transaction is carried out by the transaction device and a RFID device will scan the security tag. A processer will determine whether an identifier associated with security tag matches an identifier associated with the transaction. If the identifier of the security tag matches an approved identifier the processer will instruct the gate or blocker to move from a closed position, where the magnet of the magnetic detacher is blocked, to an open position, where the magnetic is accessible and where the security tag may be removed.

In an aspect, more specifically, a magnetic detacher system comprises a detacher device, including: a housing having at least one wall that defines a nest configured to receive a security tag; a gate assembly including a gate member and an actuator, wherein the actuator is configured to move the gate member between a closed position and an open position, wherein the gate member in the closed position blocks the nest, and wherein the gate member in the open position allows access to the nest; a magnet positioned on an opposite side of the housing relative to the nest and adjacent to the nest, wherein the magnet has a magnetic flux in an area of the nest sufficient to unlock a magnetic lock of the security tag; and a processor in communication with the actuator and with a transaction system, wherein the processor is configured to control the actuator to move the gate member from the closed position to the open position based on receipt of an unlock signal from the transaction system.

Another example aspect includes a method of detaching a security tag from an article, comprising receiving, at a detacher device, an unlock signal from a transaction system, wherein the detacher device includes: a housing having at least one wall that defines a nest configured to receive a security tag; gate assembly including a gate member and an actuator, wherein the actuator is configured to move the gate member between a closed position and an open position, wherein the gate member in the closed position blocks the nest, and wherein the gate member in the open position allows access to the nest a magnet positioned on an opposite side of the housing relative to the nest and adjacent to the nest, wherein the magnet has a magnetic flux in an area of the nest sufficient to unlock a magnetic lock of the security tag. The method further includes moving, by a processor controlling the actuator, the gate member from the closed position to the open position based on receipt of the unlock signal. Additionally, the method further includes receiving the security tag in the nest of the detacher device.

Another example aspect includes an apparatus for detaching a security tag from an article, comprising a memory and a processor in communication with the memory. The processor is configured to receive, at a detacher device, an unlock signal from a transaction system, wherein the detacher device includes: a housing having at least one wall that defines a nest configured to receive a security tag; a gate assembly including a gate member and an actuator, wherein the actuator is configured to move the gate member between a closed position and an open position, wherein the gate member in the closed position blocks the nest, and wherein the gate member in the open position allows access to the nest a magnet positioned on an opposite side of the housing relative to the nest and adjacent to the nest, wherein the magnet has a magnetic flux in an area of the nest sufficient to unlock a magnetic lock of the security tag. The processor is further configured to move, by a processor controlling the actuator, the gate member from the closed position to the open position based on receipt of the unlock signal. Additionally, the processor further configured to receive the security tag in the nest of the detacher device.

Another example aspect includes an apparatus for detaching a security tag from an article, comprising means for receiving, at a detacher device, an unlock signal from a transaction system, wherein the detacher device includes: a housing having at least one wall that defines a nest configured to receive a security tag; a gate assembly including a gate member and an actuator, wherein the actuator is configured to move the gate member between a closed position and an open position, wherein the gate member in the closed position blocks the nest, and wherein the gate member in the open position allows access to the nest a magnet positioned on an opposite side of the housing relative to the nest and adjacent to the nest, wherein the magnet has a magnetic flux in an area of the nest sufficient to unlock a magnetic lock of the security tag. The apparatus further includes means for moving, by a processor controlling the actuator, the gate member from the closed position to the open position based on receipt of the unlock signal. Additionally, the apparatus further includes means for receiving the security tag in the nest of the detacher device.

Another example aspect includes a computer-readable medium of detaching a security tag from an article, executable by a processor to receive, at a detacher device, an unlock signal from a transaction system, wherein the detacher device includes: a housing having at least one wall that defines a nest configured to receive a security tag; a gate assembly including a gate member and an actuator, wherein the actuator is configured to move the gate member between a closed position and an open position, wherein the gate member in the closed position blocks the nest, and wherein the gate member in the open position allows access to the nest a magnet positioned on an opposite side of the housing relative to the nest and adjacent to the nest, wherein the magnet has a magnetic flux in an area of the nest sufficient to unlock a magnetic lock of the security tag. The instructions are further executable to move, by a processor controlling the actuator, the gate member from the closed position to the open position based on receipt of the unlock signal. Additionally, the instructions are further executable to receive the security tag in the nest of the detacher device.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1A:
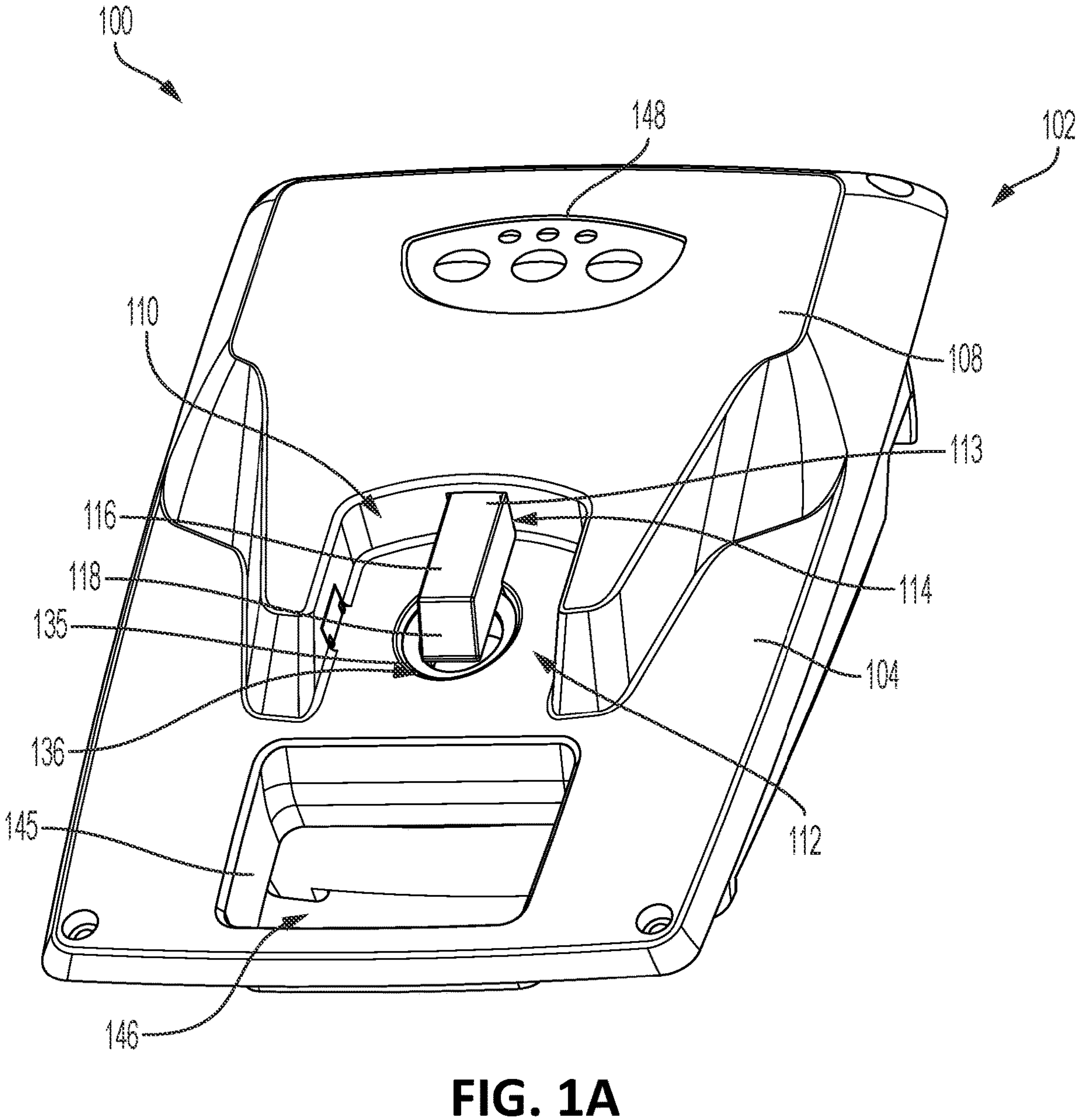
FIG. 1A is a top perspective view of a portion of one example of a magnetic detacher device for use with an electronic security tag having a magnetic locking mechanism, wherein the magnetic detacher device includes a movable blocker or gate that provides selective access to the magnetic field of the magnetic detacher device, wherein the movable blocker or gate is in the closed position.

Various aspects of the disclosure are now described with reference to the drawings, wherein like reference numerals are used to refer to elements throughout. In the following description, for purposes of explanation, numerous specific details are set forth in order to promote a thorough understanding of one or more aspects of the disclosure. It may be evident in some or all instances, however, that any aspects described below can be practiced without adopting the specific design details described below.

Aspects of the disclosure include a magnetic detacher with a blocker or gate movable to restrict or allow access to a nest for receiving an electronic security tag, adjacent to a magnetic field of a magnet, and for subsequently unlocking a magnetic lock of the security tag. The magnetic detacher with the movable gate or blocker may provide one or more advantages over existing detacher systems, such as but not limited to, stopping the unauthorized unlocking and removal of security tags from products.

In an example implementation, the magnetic detacher includes a detacher device configured to receive an unlock signal from a transaction system. The detacher device further includes a housing, configured to receive a security tag, and a gate assembly including a gate member, configured to move between a closed position and an open position depending on whether an unlock signal has been received. When the gate member moves to the open position a security tag may be subsequently received and removed from an article by the magnetic detacher.

Figure 1B:
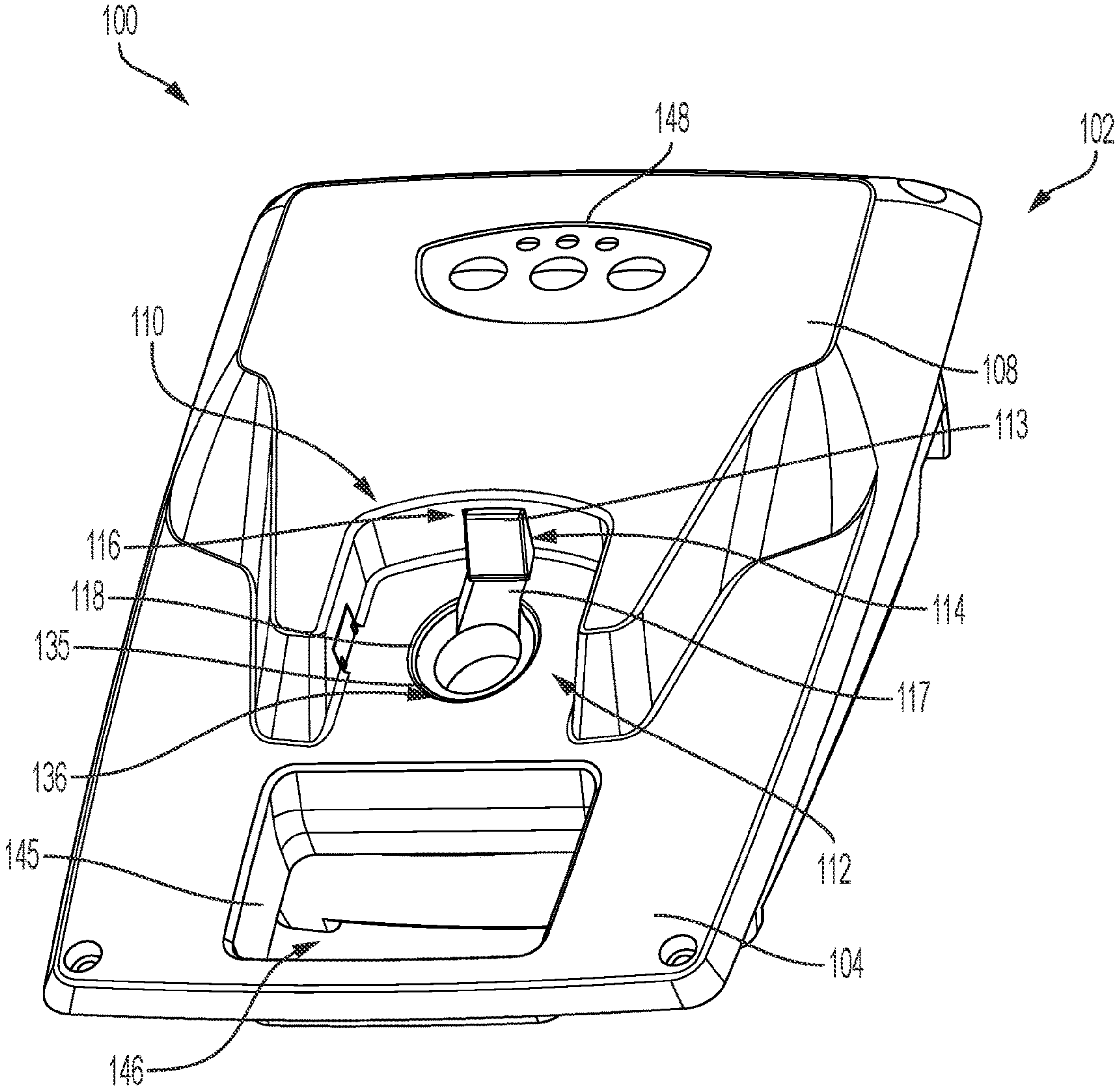
FIG. 1B is a top perspective view of the portion of the magnetic detacher device of FIG. 1A with the movable blocker or gate is in an open position to allow access to the magnetic field of the magnet of the device.

Referring to FIGS. 1A-G, 2A-B, 3A-E, and 4, in an exemplary aspect, such as in a security system 180 (FIG. 1D), a magnetic detacher 100 includes a controllable gate 116 that enables or blocks access to a magnet used to unlock the security tag 160. For example, the security system 190 controls detaching of the security tag 160 from an article 168 stored within a location 170, and includes a security sensor 172 near an entry/exit point 174 that detects when the article 168 having the security tag 160 attached thereto is taken past the security sensor 172 and outside of the location 170 through the entry/exit point 174. For instance, the security system 180 may be an electronic article surveillance system, the security tag 160 may be an electronic article surveillance tag having an acousto-magnetic element and/or a radio frequency identification (RFID) module, the security sensor 172 may be one or more antenna configured to transmit a signal to the security tag 160 or in an area of the entry/exit point 174 and to listen for a response signal from the security tag 160, wherein the response signal or a lack of such response signal indicates the security tag 160 is deactivated, such as when the article 168 to which the security tag 160 is attached has been paid for in a transaction 176 with a transaction terminal 178. For instance, the transaction terminal 178 is connected to the magnetic detacher 100 and may be connected to a transaction system 180, such as via a wired and/or wireless communication network 182, and may include a point of sale terminal 184, which includes a local or remote computer connected to the transaction system 180 via the communication network 182 and/or a mobile communication device 186, such as a cell phone or tablet, connected to the transaction system 180 via the communication network 182, or any other type of computer device. In some cases, the transaction system 180 may be a payment system, such as but not limited to an automated clearing house system.

The magnetic detacher 100 includes a magnetic detacher housing 102 that defines a structure to which all or a portion of the components of the magnetic detacher 100 may be attached. For example, in one implementation, the housing 102 includes a housing top portion 104 and a housing bottom portion 106 (FIG. 4), which may be attached to one another and together may contain all of the elements of the magnetic detacher 100.

Figure 1C:
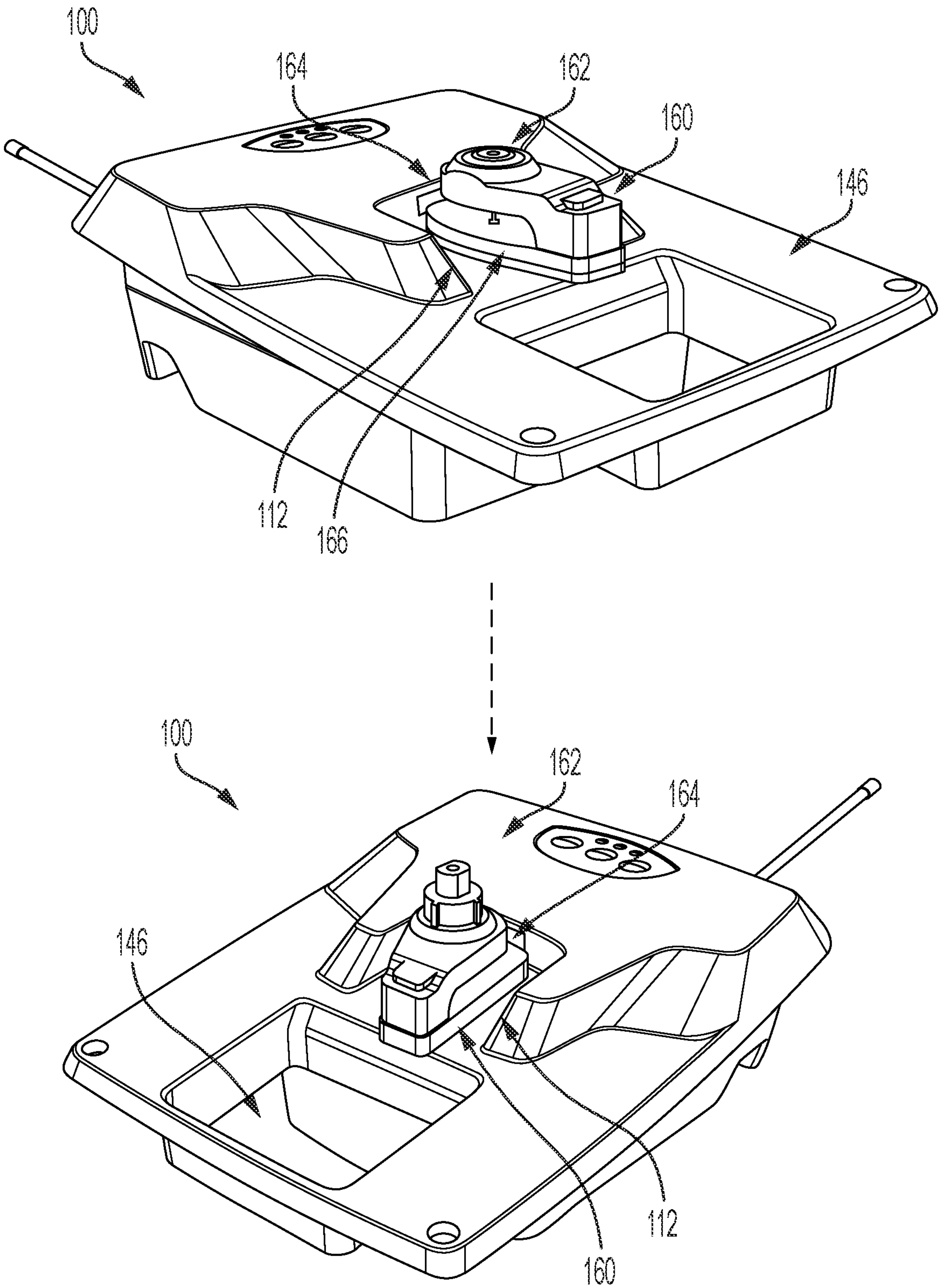
FIG. 1C is a top perspective view of the magnetic detacher device of FIGS. 1A-B, with a security tag inserted into a nest of the magnetic detacher and transitioning from being in a locked state (top portion of the figure, with the top button depressed and pin extending through an opening, or mouth, of the tag and into a bottom portion of the tag) to an unlocked state (bottom portion of the figure, with the top button extended and the pin withdrawn into a top portion of the tag).
Figure 1D:
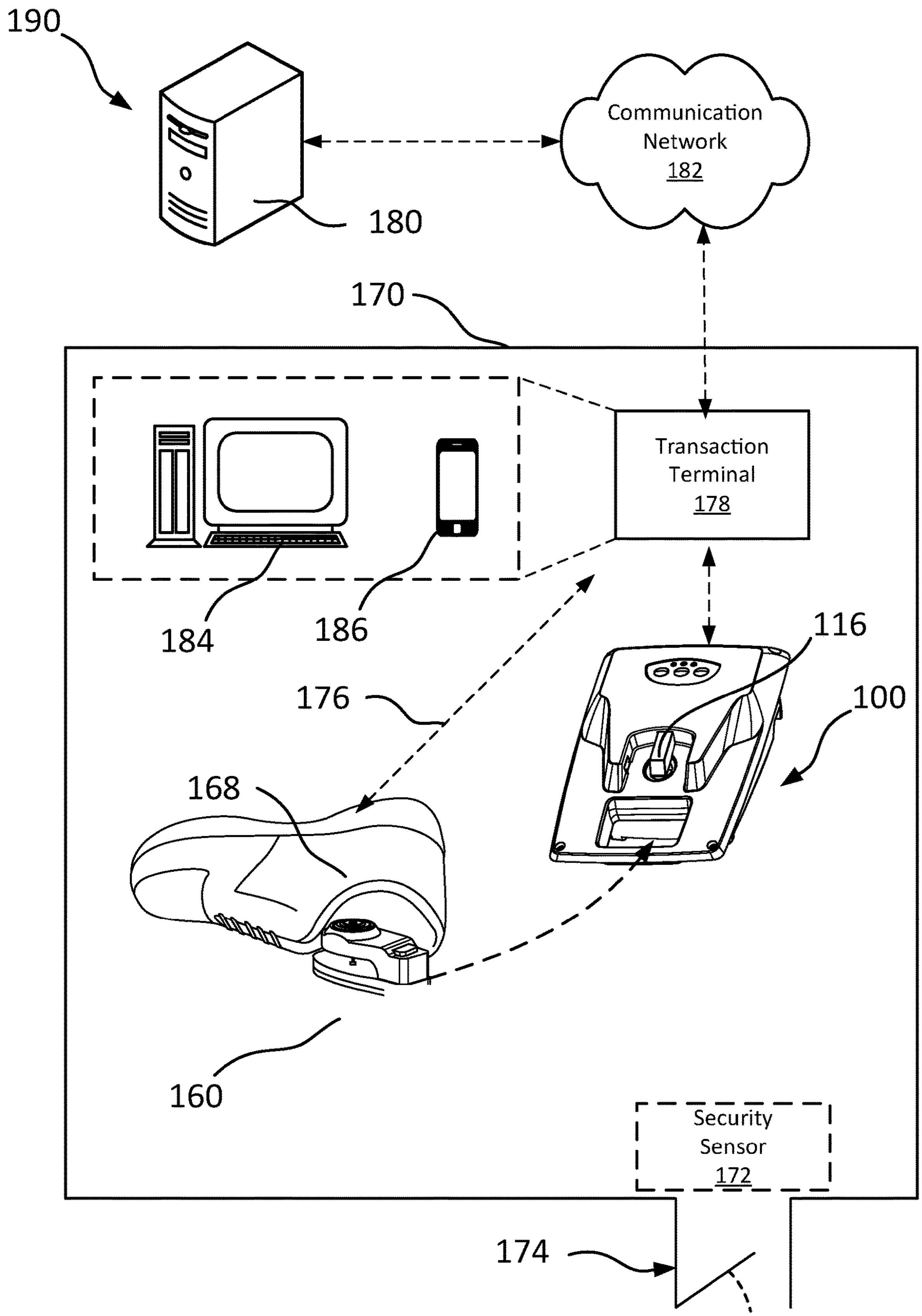
FIG. 1D is a schematic diagram of the magnetic detacher of FIGS. 1A-C in an example transaction system.
Figure 4:
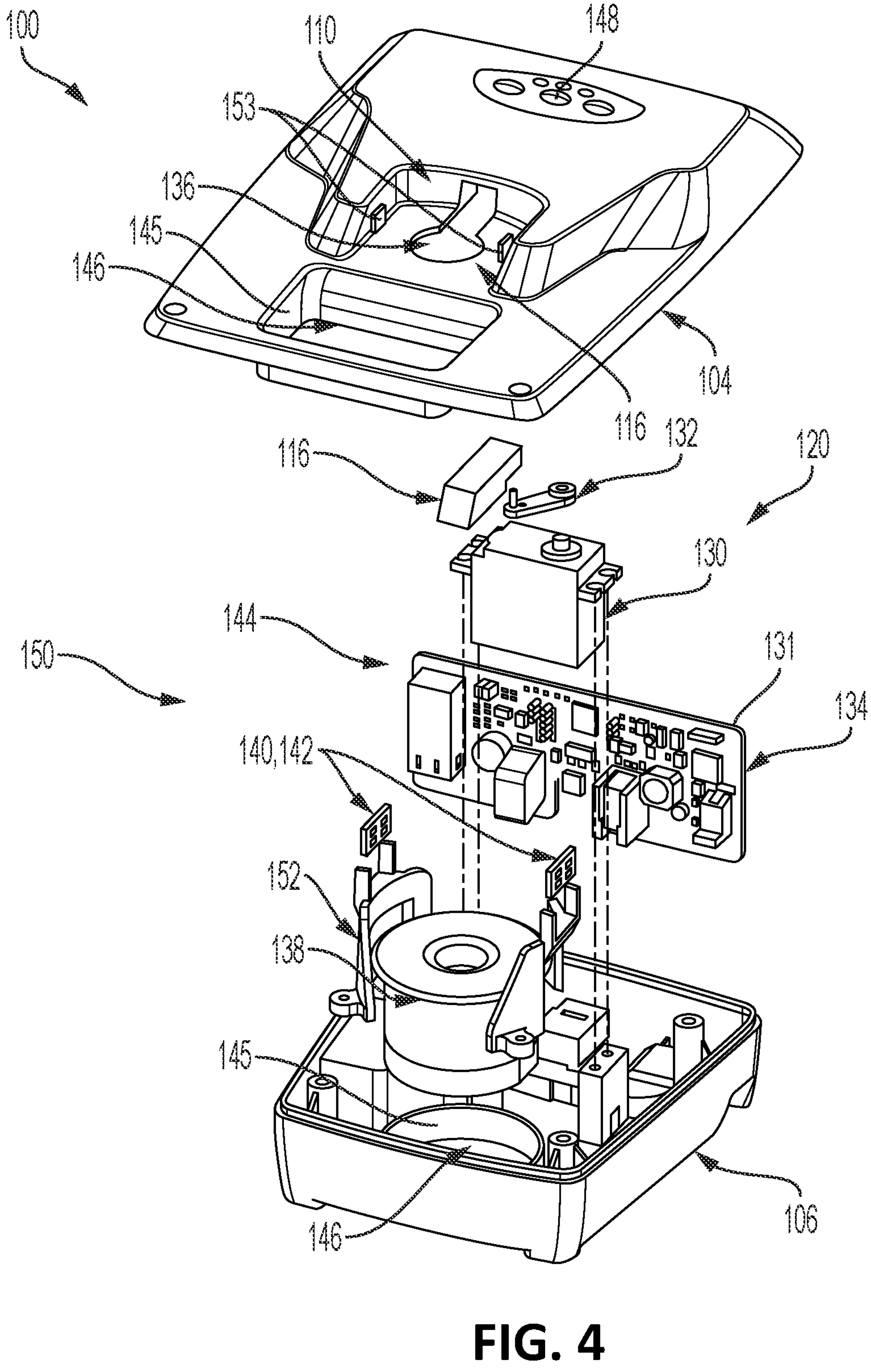
FIG. 4 is an exploded view of one example of the magnetic detacher device of FIGS. 1A-B including additional components of the device.

In an aspect, the housing top portion 104 includes a raised portion 108 at one end, wherein the raised portion 108 further includes at least one wall 110 that partially defines a nest 112 configured to receive the security tag 160, which has a magnetic lock 162 (FIG. 1C). In one example, which should not be construed as limiting, the magnetic lock 162 may include a mechanism configured to hold or release the article 168 from within a mouth 164 of the security tag 160 via movement of a pin 166 (FIG. C). For instance, the movement of the pin 166 includes extending from a top portion of the security tag 160, across the mouth 164, and into a bottom portion of the security tag 160, or moving from extending across the mouth 164 and into the bottom portion of the security tag 160 to being substantially withdrawn from the mouth 164, e.g., such as into the top portion of the security tag 160. The nest 112 includes a magnet opening 136 in the housing top portion 104 to enable the magnetic lock 162 of the security tag 160 to be positioned adjacent to the magnet 138, which may be located below the nest 112 (FIG. 4).

The wall 110 partially defining the nest 112 may be a single continuous wall or a plurality of wall segments, which in some implementations may form a curved shape configured to assist in positioning the security tag 160 within the nest 112 and/or to limit an extent to which the security tag 160 may be laterally moved in one or more directions within the nest 112. In an aspect, the wall 110 defines a partially enclosed space, which in turn defines at least a portion of the nest 112, which is sized and shaped to receive the security tag 160 and position the magnetic lock 162 adjacent to the magnet 138. It should be understood that the wall 110 may have various shapes, or may be a straight wall.

Figure 2A:
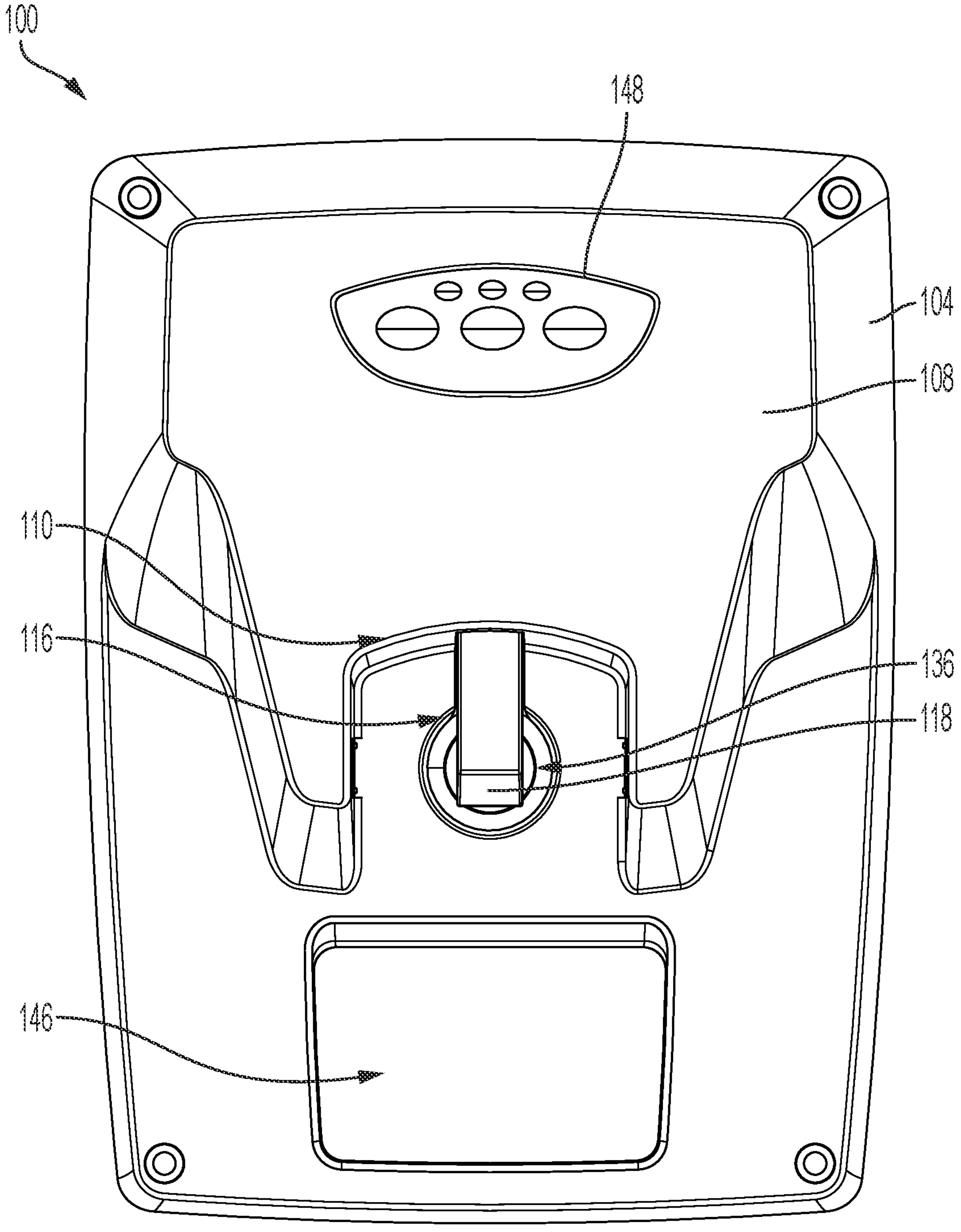
FIG. 2A is a top view of the magnetic detacher device of FIG. 1A, e.g., in the closed position.
Figure 2B:
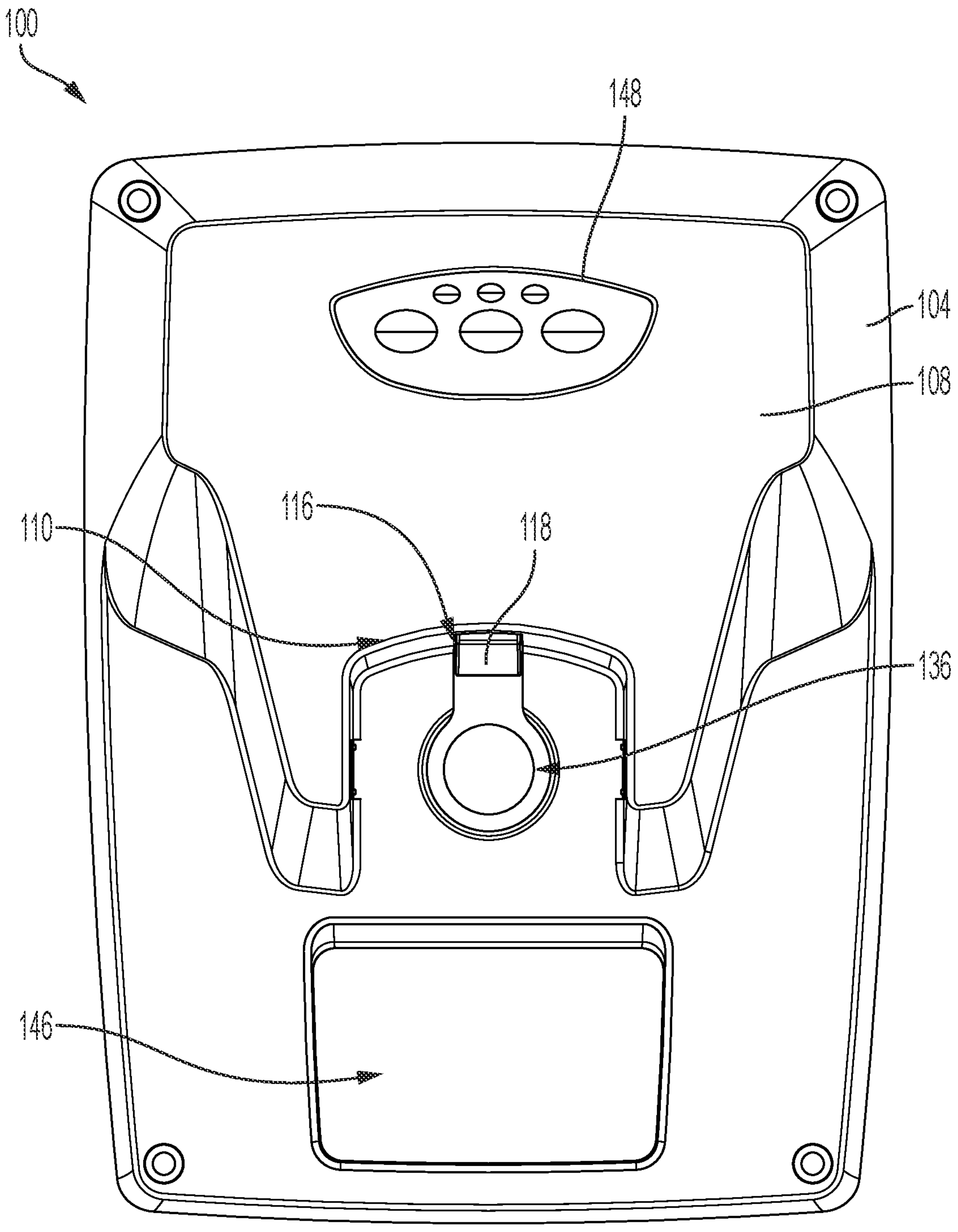
FIG. 2B is a top view of the magnetic detacher device of FIG. 1B, e.g., in the open position.
Figure 3A:
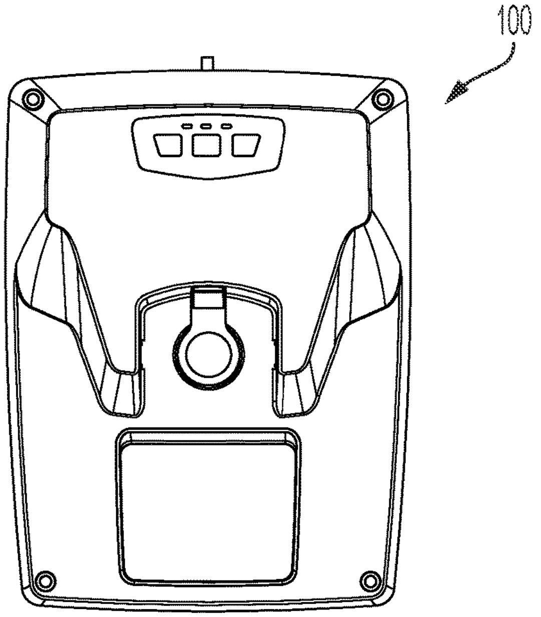
FIGS. 3A-E are top, front, rear, left, and right views of the portion of the magnetic detacher device of FIGS. 1A-B.
Figure 3D:
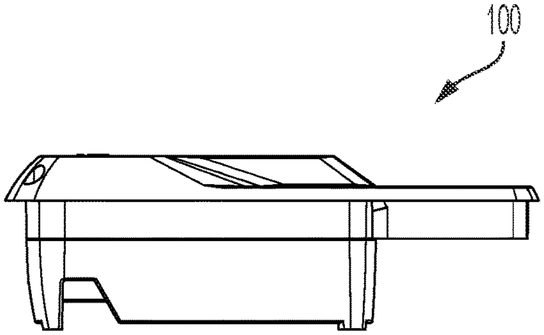
Figure 3B:
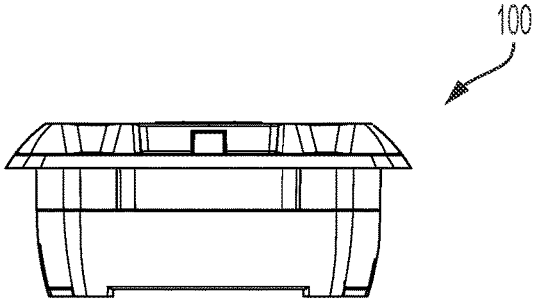
Figure 3E:
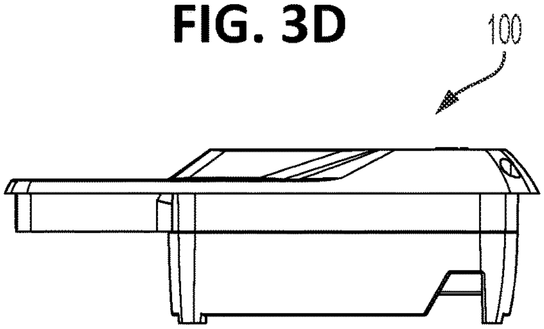
Figure 3C:
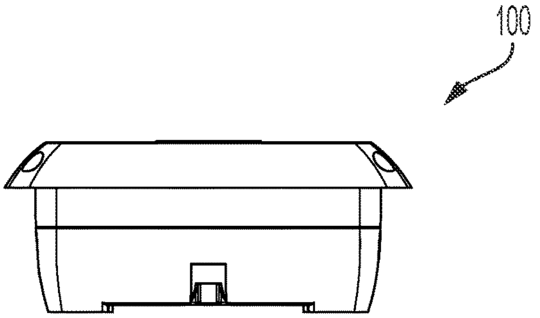

The wall 110 further includes one or more internal walls 113 that define a gate opening 114 configured to allow a gate 116, also referred to herein as a blocker, to movably extend out of and into the housing 102, and correspondingly into and out of the nest 112, to respectively block or allow placement of the security tag 160 in the nest 112 and/or the magnet opening 136. In other words, the gate 116, which may be partially guided by the gate opening 114, is configured to move between a closed position (FIGS. 1A and 2A) and an open position (FIGS. 1B, 2C, and 2B). Additionally, in some cases, the housing top portion 104 adjacent to the gate opening 114 may also include one or more internal walls 117, such as a bottom wall and opposing side walls, to further aid in guiding or limiting movement of the gate 116. When the gate 116 is in the open position, the gate 116 allows access to the nest 112 and allows the security tag 160 to be placed into the nest 112 for unlocking and removal from being attached to the article 168. Specifically, in the open position, the gate 116 allows the security tag 160 to be placed adjacent to a magnetic field generated by a magnet 138 (FIG. 4) of the magnetic detacher 100, thereby causing the magnetic lock 162 (FIG. 1C) of the security tag 160 to move from a locked state to an unlocked state (see FIG. 1C). Alternatively, when the gate 116 is in the closed position, the gate 116 will at least partially block or restrict access to the nest 112 and/or magnet opening 136 such that the security tag 160 may not be unlocked. Specifically, in the closed position, the gate 116 prevents the security tag 160 from being placed sufficiently close to the magnetic field generated by a magnet 138 of the magnetic detacher 100, e.g., in a position where the magnetic field is not strong enough to unlock the magnetic lock 162, thereby preventing movement of the magnetic lock 162 of the security tag 160 from a locked state to an unlocked state. In other words, in the closed position, the gate 116 has a size and a position that maintains a sufficient spacing between the magnetic lock 162 of the security tag 160 and the magnetic field of the magnet 138 such that the security tag 160 cannot be unlocked.

Figure 1E:
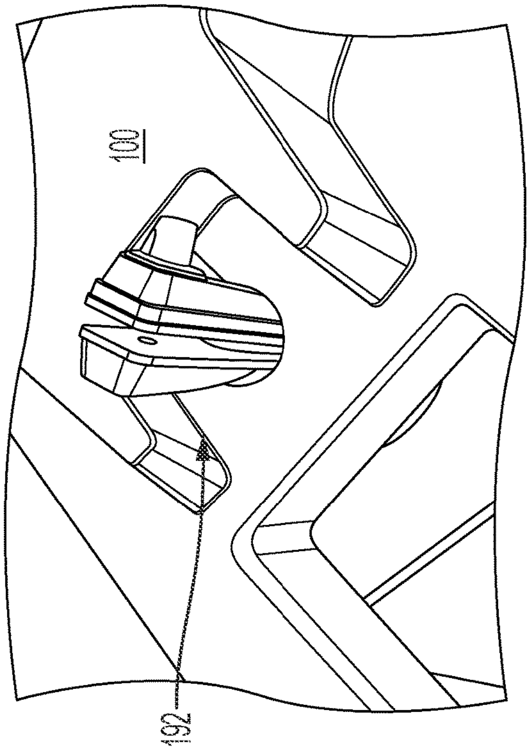
FIGS. 1E-G are a perspective view, a top view, and a top view, respectively, of different types of security tags used in the magnetic detacher device of FIGS. 1A-D.
Figure 1F:
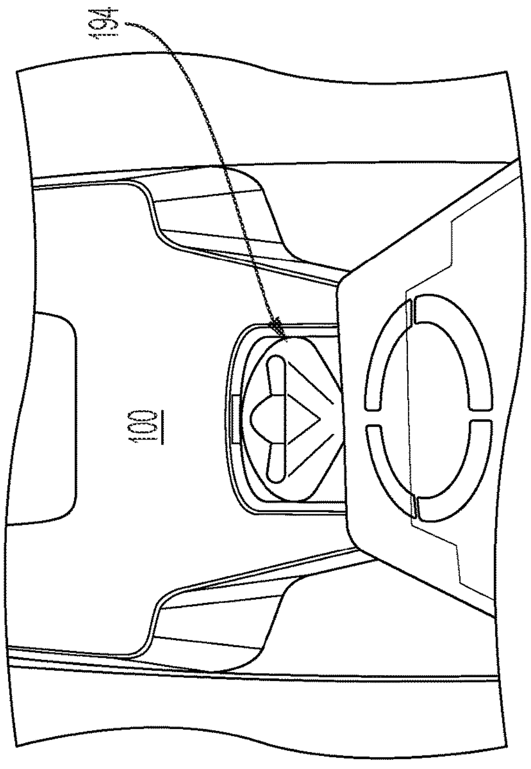
Figure 1G:
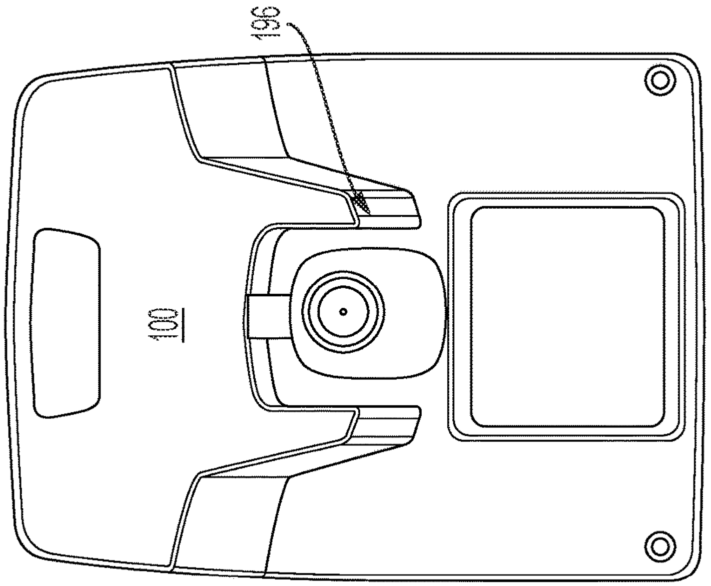

Referring to FIGS. 1E-G, it should be understood that the nest 112 of the magnetic detacher 100 may be configured to accept a plurality of different types and/or shapes of security tags, such as but not limited to security tags 192, 194, and 196.

In an aspect, when moving from the closed position to the open position, all or a substantial portion of the gate 116 will retract into the raised portion 108 of the housing top portion 104 through the gate opening 114. In one implementation, for example, the gate 116 extends longitudinally and moves linearly. In other implementations, however, the gate 116 may extend arcuately and has a rotational movement. In any case, when the gate 116 has been retracted into the housing top portion 104, an end wall 118 of the gate 116 may become flush or close to flush with the wall 110 of the housing top portion 104. Similarly, when moving from the open position to the closed position, the gate 116 will extend out of the gate opening 114 to a position substantially impeding access to the nest 112. It should be understood that the illustrated gate 116 and raised portion 108 of the housing top portion 104 is one example implementation, and that the present disclosure includes other structural configurations in which a gate may be moved into or out of a position to block access of a magnetic lock of a security tag to a magnetic field of a magnetic detacher.

Figure 5A:
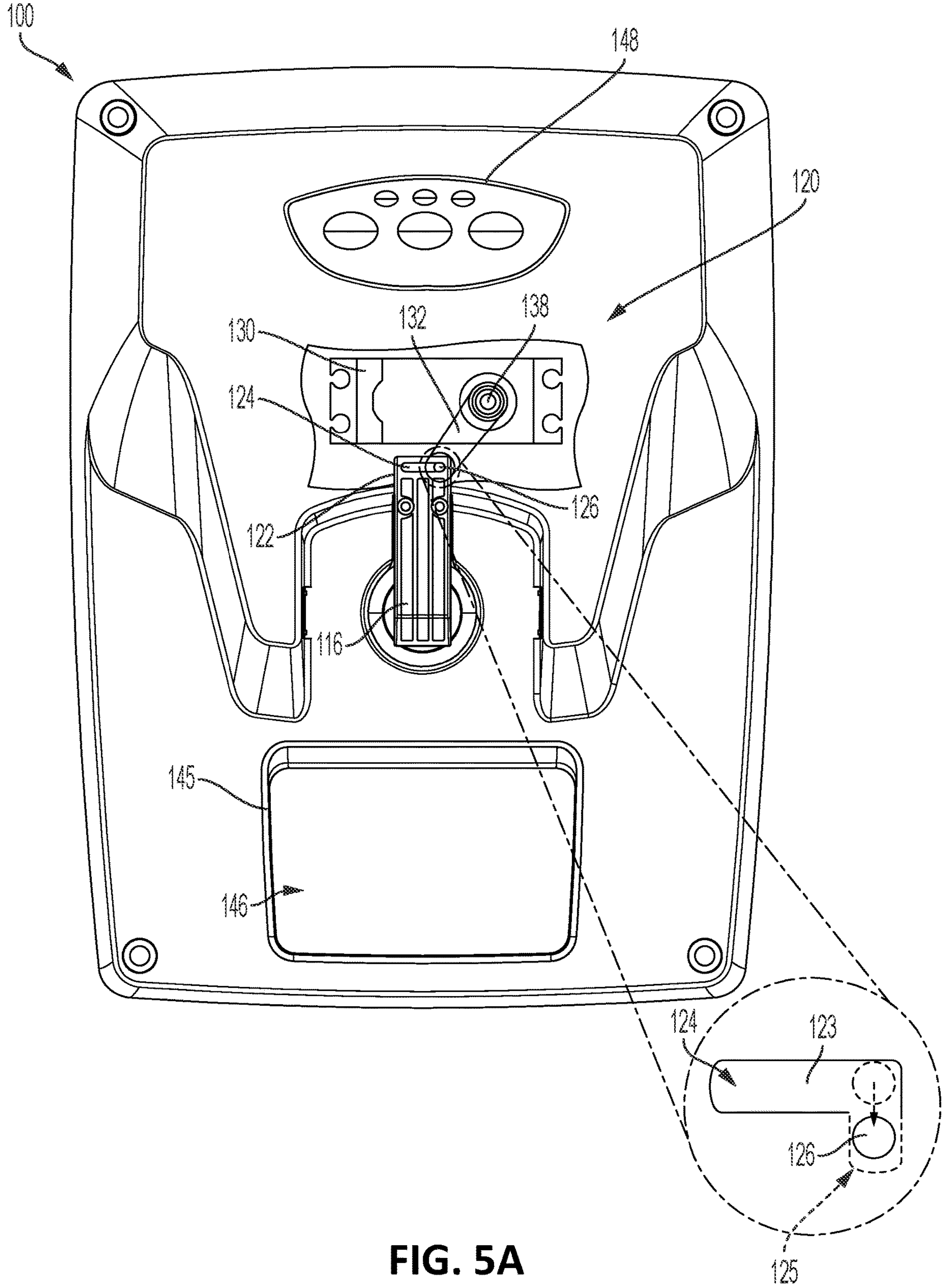
FIG. 5A is a top view of the magnetic detacher device of FIG. 1 with the gate in a closed position to block access to a magnetic field of a magnet of the device, including a partial cut-away view of a portion of the gate control mechanism including a plate having a track in which a pin travels to move the gate from a closed position to the open position, and further including a close-up view of the track having an optional locking slot.
Figure 5B:
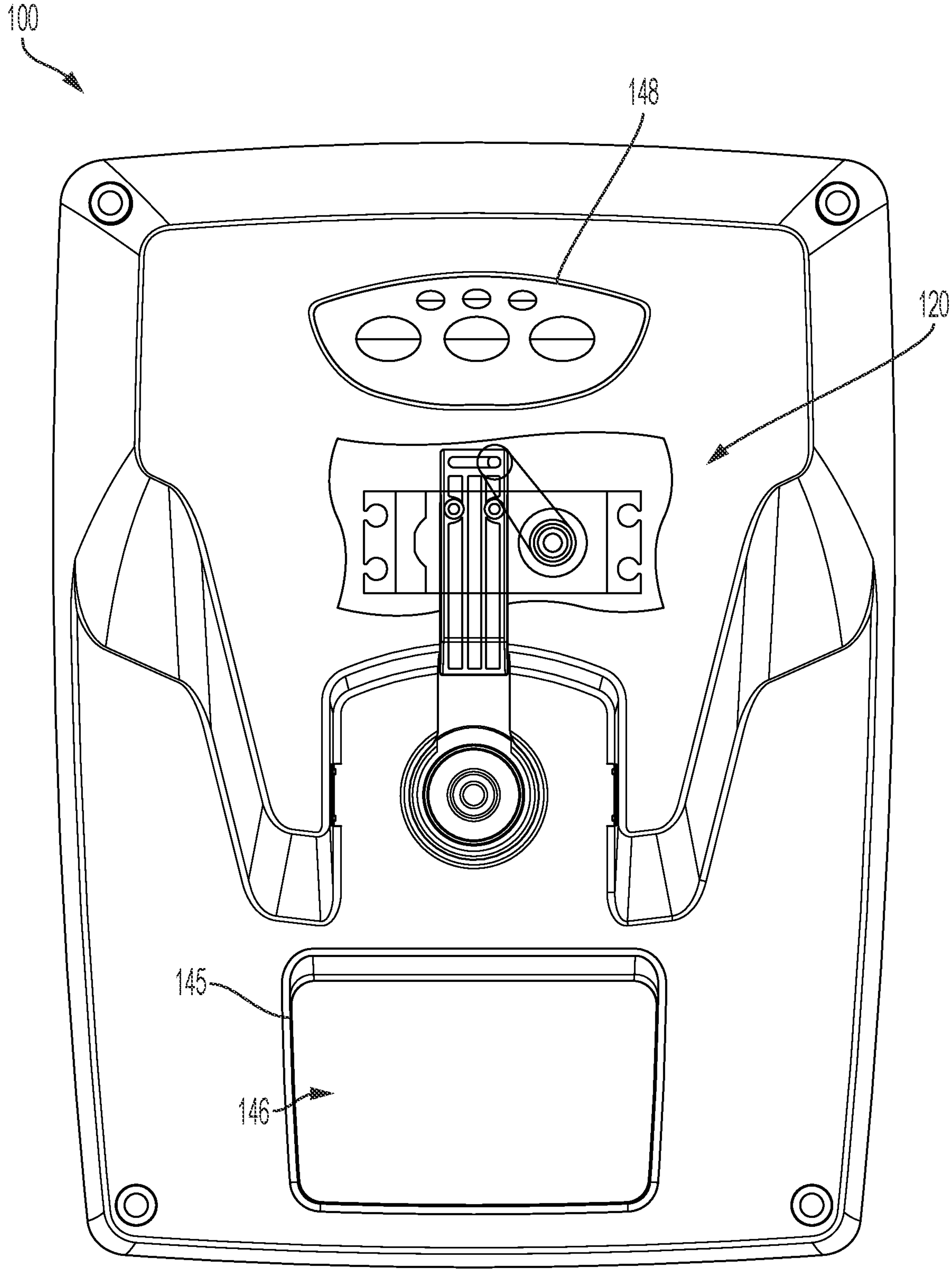
FIG. 5B is a top view of the gate control mechanism of the magnetic detacher device, similar to FIG. 5A and including the partial cut-away view of the portion of the gate control mechanism, but with the gate in an open position to allow access to the magnetic field of the magnet of the device.

In an aspect, more specifically referring to FIG. 4 and additionally referring to FIGS. 5A and 5B, the gate 116 is part of a gate assembly 120 configured to move the gate 116 between the open and closed positions. For instance the gate assembly 120 includes an actuator 130 connected to the gate 116 and controlled by a processor 134 to move the gate 116 between the open and closed positions. For example, in one implementation, the processor 134 may be mounted on a circuit board 131 and includes a communication interface configured to receive a gate open command to move the gate 116 to the open position and/or a gate close command to move the gate 116 to the closed position. In one scenario, the communication interface of the processor 134 may be in communication, e.g., via a wired and/or wireless communication link, with the transaction terminal 178 used to purchase an article to which the security tag 160 is attached, and the transaction terminal 178 sends the gate open command to the processor 134 in response to the transaction 176 in which payment for the article 168 is received. In this case, the article 168 may be any product, and the transaction terminal 178 may be a point of sale terminal, or a mobile device executing a self-checkout application.

In an alternative implementation, the gate 116 may be configured to move between the open and closed positions in response to a manual input by a user. In this implementation, for example, the magnetic detacher 100 may include a user interface, such as a key and/or indicator pad 148, which may include one or more keys or buttons (e.g., "open" button, "close" button) that can receive a user input, such as a touch or a depression, which in turn causes the processor 134 to send manual a gate open command or a gate close command to the actuator 130 to open or close the gate 116. Additionally the magnetic detacher 100 may be connected to the transaction terminal 178 through local or remote communication links, such as wireless or wired connections including but not limited to Wi-Fi, Bluetooth, NFC, hard-wiring, so that the various functions of the magnetic detacher 100, such as the opening and closing of the gate 116, can be manually controlled by a user providing a corresponding user input to the transaction terminal 178. In some cases, these manual controls could be utilized by a person of official capacity if the gate 116 is malfunctioning or if an alternative scenario arises where the magnetic detacher 100 requires manual override or usage.

In one implementation where the gate 116 extends longitudinally and moves linearly, the gate assembly 120 transforms rotatable movement provided by the actuator 130 into linear movement of the gate 116. For example, in one implementation (see FIGS. 5A and B), the gate 116 is fixedly connected to a plate 122 having an internal plate wall that defines a track 124 sized to receive a pin 126. The pin 126 extends into and is configured to slidably move within the track 124 and exert a force on the gate member 116 to move the gate member 116 between the closed position and the open position. The pin 126 is further connected to the actuator 130, such as by not limited to a controllable servomotor or stepper motor having a rotatable axle. In an aspect, an arm member 132 connects the pin 126 to the actuator 130. The arm member 132 extends between a first end and a second end, wherein the pin 126 is connected at the first end and the rotatable axle of the actuator 130 is connected at the second end. The processor 134 is further configured to control the actuator 130 to rotate the axle to move the pin 126 between a first track position (FIG. 5A) on the track 124 to move the gate member 116 to the closed position and a second track position (FIG. 5B) on the track 124, to correspondingly move the gate member 116 between the closed position and the open position.

Referring specifically to FIGS. 5A and C-E, in some implementations, the track 124 may additionally include a locking slot 125 extending transverse to the track 124, such as adjacent to the first track position. When the pin 126 is moved in the locking slot 125 when the gate 116 is in the closed position, the locking slot 125 will oppose movement of the gate 116 to the open position or the pin 126 toward the second track position on the track 124. In other words, the locking slot 125 will help prevent movement of the gate 116 from the closed position to the open position that is not being caused by the actuator 130, such as if a person attempts to apply an external force, F (see FIG. 5D), to the gate 116 in the closed position in an attempt to move it to the open position.

Figure 5E:
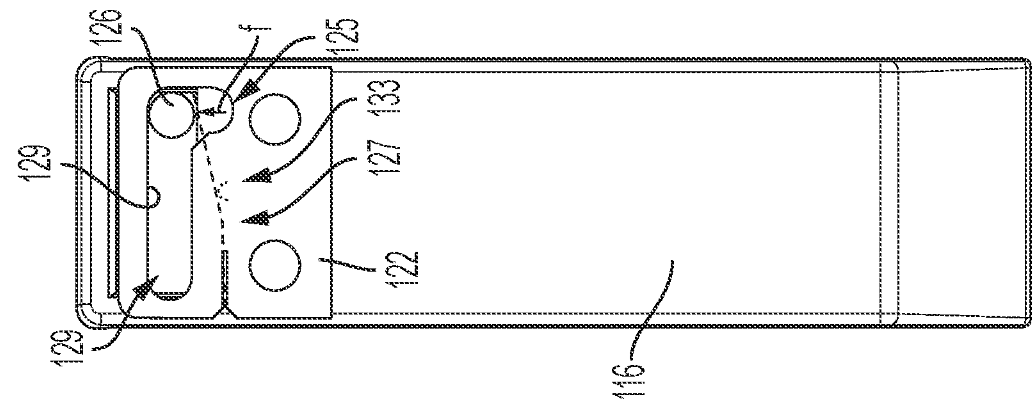
FIGS. 5C to 5E are a top partial cut-away views of a portion of the gate mechanism of FIGS. 5A-B, including the plate member with the locking slot and a biasing member attached to the gate member, with the pin transitioning from a normal operation (FIG. 5C) with the pin in the track, to the gate member receiving an external force (FIG. 5D) causing the pin to move from the track into the locking slot, and transitioning back to normal operation (FIG. 5E) upon removal or reduction of the external force.
Figure 5D:
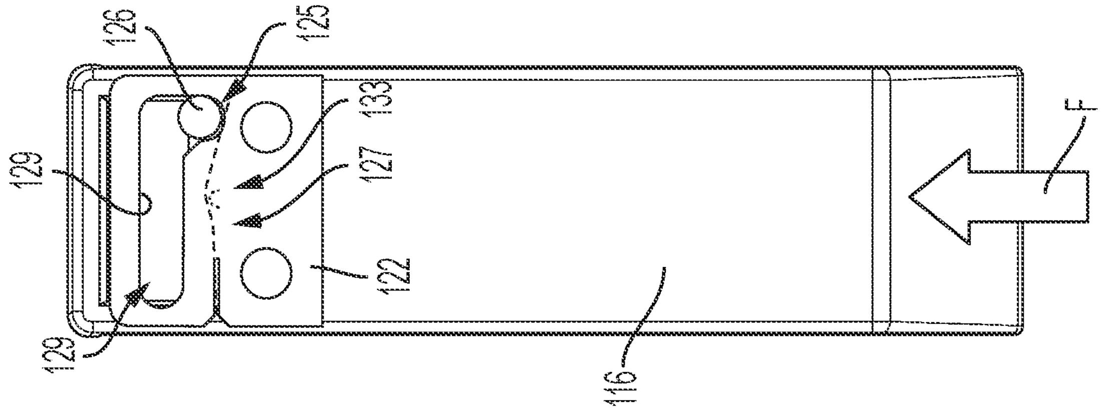
Figure 5C:
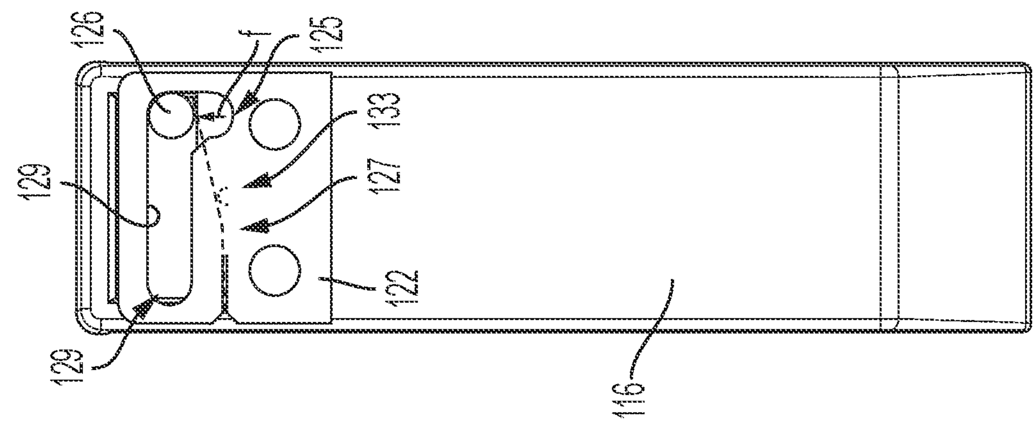

Referring more specifically to FIGS. 5C-5E, in one example implementation, the plate 122 having the track 124 and the locking slot 125 additionally includes a biasing member 127, such as but not limited to a leaf spring or a strip of spring steel, configured to apply a biasing force, f, to keep the pin 126 aligned with the track 124 and out of the locking slot 125 during normal operation. For instance, the biasing member 127 is configured to apply a sufficient amount of biasing force, f, to prevent loose or unnecessary movement of the gate 116 while in the closed position, which may occur due to the extra space in the track 124 provided by the locking slot 125. For instance, referring to FIG. 5C, with the gate 116 in the closed position, the pin 126 will not engage with the locking slot 125 since the biasing force, f, of the biasing member 127 forces the pin 126 to interact with the opposite surface 129 of the track 124. This interaction of the pin 126 with the opposite surface 129 of the track 124 continues when the actuator 130 (FIG. 4) rotates the arm member 132 (FIG. 4) to cause the pin 126 to pull on and translate across the track 124 to move the gate 116 to the open position. In other words, the biasing member 127 is configured to act on the pin 126 when the pin 126 adjacent to the locking slot 125 to resist the pin 126 from moving into the locking slot 125 unless the biasing force, f, is overcome by the external force, F.

In contrast, referring to FIG. 5D, when the external force, F, pushes the gate 116 and overcomes the biasing force, f, of the biasing member 127, the biasing member 127 deflects and allows slight movement of the gate 116, which in turn causes the pin 126 to move into the locking slot 125. Consequently, when positioned in the locking slot 125, the pin 126 is blocked from traversing the track 124 and moving the gate 116 into the open position. Thus, the locking slot 125 prevents the use of the external force, F, to move the gate 116 from the closed position to the open position.

Further, referring to FIG. 5E, once the external force, F, is no longer being applied to the gate 116 (or is reduced to be less than the biasing force, f), then the biasing force, f, acting on the pin 126 causes the pin 126 to move back out of the locking slot 125 to its original position within the track 124. It should be noted that, in some cases, the biasing member 127 may be fixed to the plate 122, such as being force fit into a slot. Also, in some cases, the plate 122 may include a fulcrum member 133 in a fixed position to provide a pivot point for movement of the biasing member 127, wherein the fixed position is configured to provide the biasing member 127 with a configured amount of biasing force, f, to reduce loose movement of the pin 126 within the track 124 but to allow the pin 126 to move into the locking slot 125 in response to application of a certain external force, F, to the gate 116.

Referring back to FIGS. 1A-G, 2A-B, 3A, and 4, as mentioned above, the housing top portion 104 includes the magnet opening 136 that is defined by one or more internal walls 135 located within or adjacent to an area of the nest 112. The magnet opening 136 is further located adjacent to, e.g., directly above, the magnet 138 contained within the magnetic detacher housing 102. The magnet 138 has a magnetic field and/or magnetic flux in an area of the nest 112 sufficient to unlock the magnetic lock 162 of the security tag 160 on an article, when the security tag 160 is positioned within the nest 112. In an aspect, the magnet opening 136 is sized to receive at least the part of the security tag 160 adjacent to or including the magnetic lock 162 to allow the magnetic lock 162 to be placed sufficiently close to the magnetic field of the magnet 138 to allow the magnetic lock 162 to be unlocked such that the pin 166 of the magnetic lock 162 can be subsequently removed from an article.

When the gate 116 is in the closed position it extends across and blocks the magnet opening 136 thereby preventing the magnet 138 from unlocking the magnetic lock 162 of the security tag 160, and hence prevents detachment of the security tag 160 from an article. The processor 134 is in communication with a transaction system and the actuator 130 and thereby sends instructions to the actuator 130 to move the gate 116 between the open and closed positions based on receiving instructions from the transaction terminal 178 and/or the transaction system 180. For example, the transaction terminal 178 and/or transaction system 180 may relay an unlock signal, based on the transaction to purchase the article 168 being completed or being at least partially completed, to the processor 134, which in turn instructs the actuator 130 to move the gate 116 from the closed position to the open position. In turn, the movement of the gate 116 to the open position thereby exposes the magnet opening 136 and magnet 138, which allows the security tag 160 to be placed within the nest 112 in a position that allows the magnet 138 to unlock the magnetic lock 162 of the security tag 160, and hence enable detachment of the security tag 160 from the article 168.

In some alternative or additional aspects, the processor 134 and/or the actuator 130 may additionally utilize a threshold value of electrical current to maintain the gate 116 in the closed position. For example, the actuator 130 may receive a certain value of electrical current in order to provide a force to move or maintain the gate 116 in the closed position and/or to resist movement of the gate 116 out of the closed position. Further, the processor 134 is configured to generate an alarm if the amount of electrical current, e.g., the current value, required to maintain the gate 116 in the closed position is exceeded, e.g., such as if a force is applied to the gate 116 in an attempt to move the gate 116 to the open position without the actuator 130 when the processor 134 has not received a command to open the gate 116. This feature prevents tampering with the gate 116 to unlock the magnetic lock 162 of the security tag 160 without a corresponding transaction 176. For example, a person may try and move the gate 116 to unblock the magnet opening 136 to attempt to remove the security tag using the magnet 138. In this case, the actuator 130 and/or processor 134 sense(s) the attempted change of position of the gate 116 and applies an increased amount of electrical current to keep the gate 116 in the closed position. In this case, if the value of the applied current exceeds a predetermined current value, then the processor 134 will generate an alarm to notify that tampering is occurring. Suitable examples of the alarm may include, but are not limited to, one or more of a sounding of an audible alarm by a speaker device, an outputting of a visual alarm by a display device or a lighting device, and/or the transmitting of an alarm message to another device, such as a computer device (e.g., of a store security personnel or a store manager or clerk). Additionally, in some aspects, the threshold will be set such that an inadvertent bumping of the gate 116, or a force exerted on the gate 116 over less than a threshold period of time, wherein such force and/or time period is configured to not amount to tampering, will not set off the alarm. This feature, which may be combined with the locking slot 125 in the track 124, will provide an additional level of security to resist unauthorized use of the magnetic detacher 100.

Figure 6A:
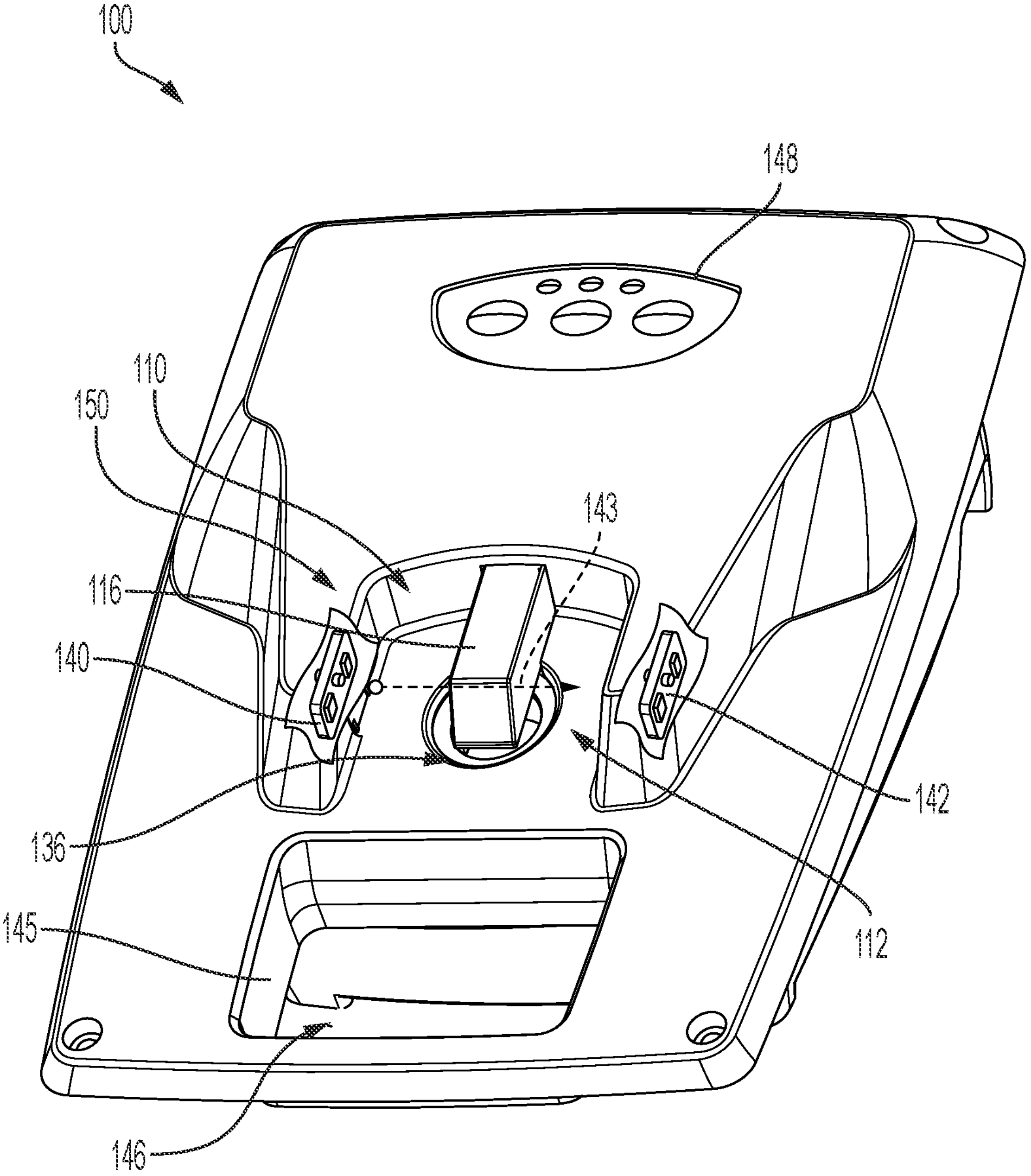
FIG. 6A is a top perspective view of the magnetic detacher device of FIG. 1, including a partial cut-away view of infrared (IR) sensors configured to detect presence of the gate or any other obstruction in the area above the magnet of the device.
Figure 6B:
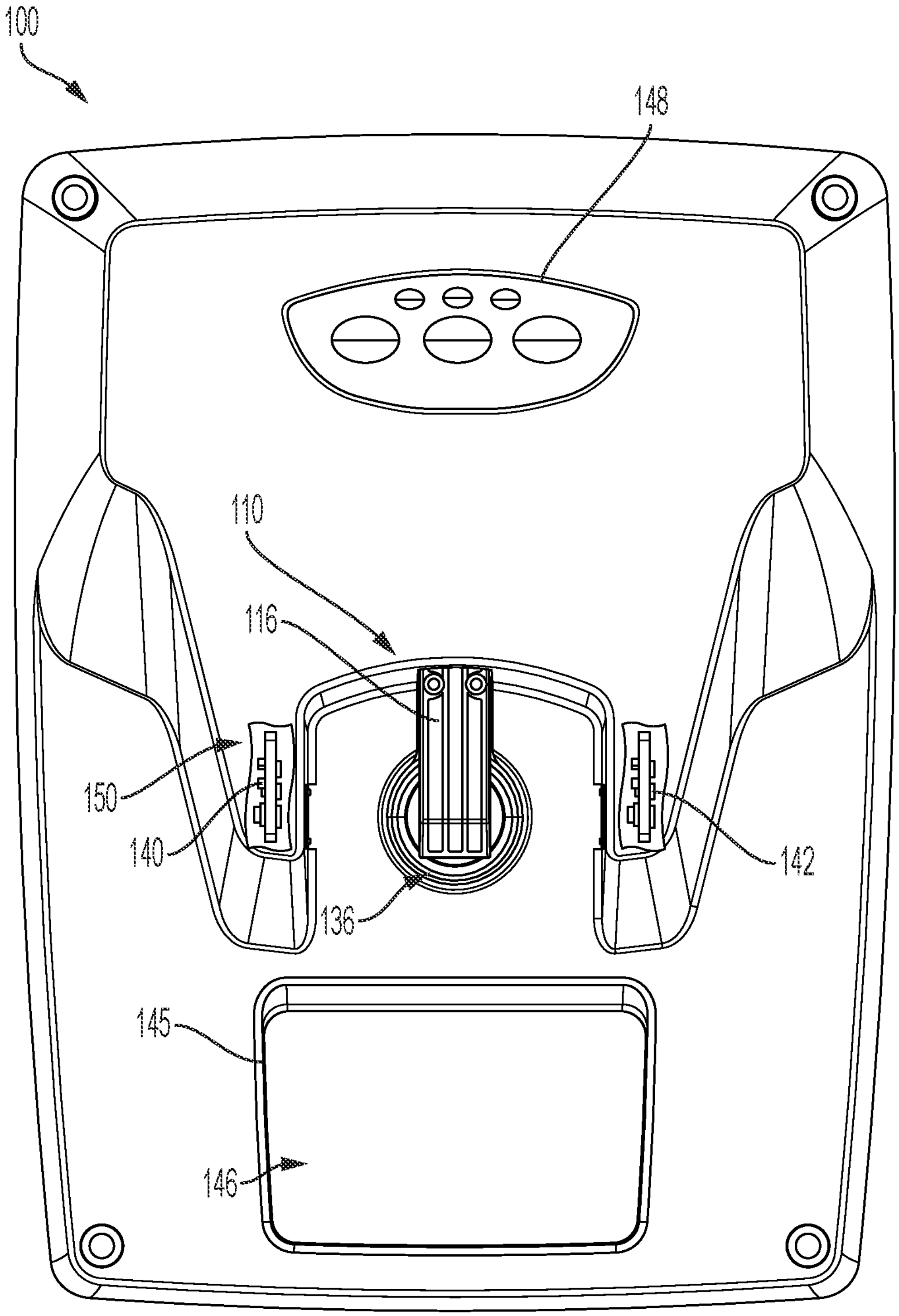
FIG. 6B is a top view of the magnetic detacher device of FIG. 6A, including a partial cut-away view of the IR sensors.
Figure 7B:
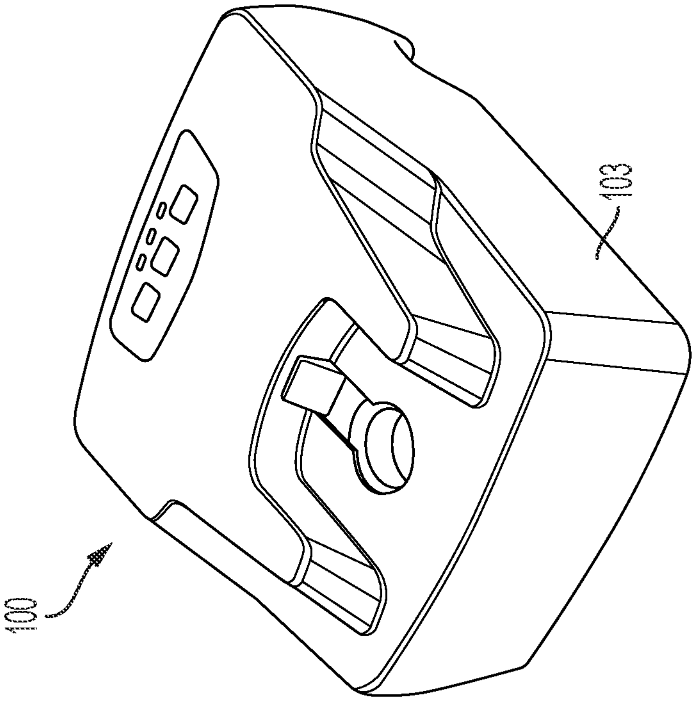
FIGS. 7A-B are top perspective view of another example of the magnetic detacher as described herein, including a housing suitable for setting the magnetic detacher on a table top.
Figure 7A:
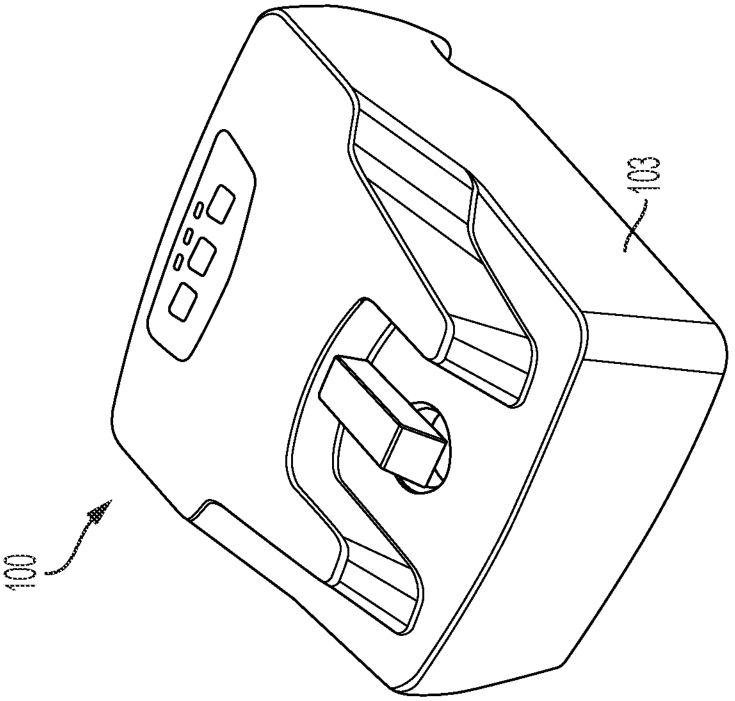
Figures 8A, 8B, 8C, 8D, 8E:
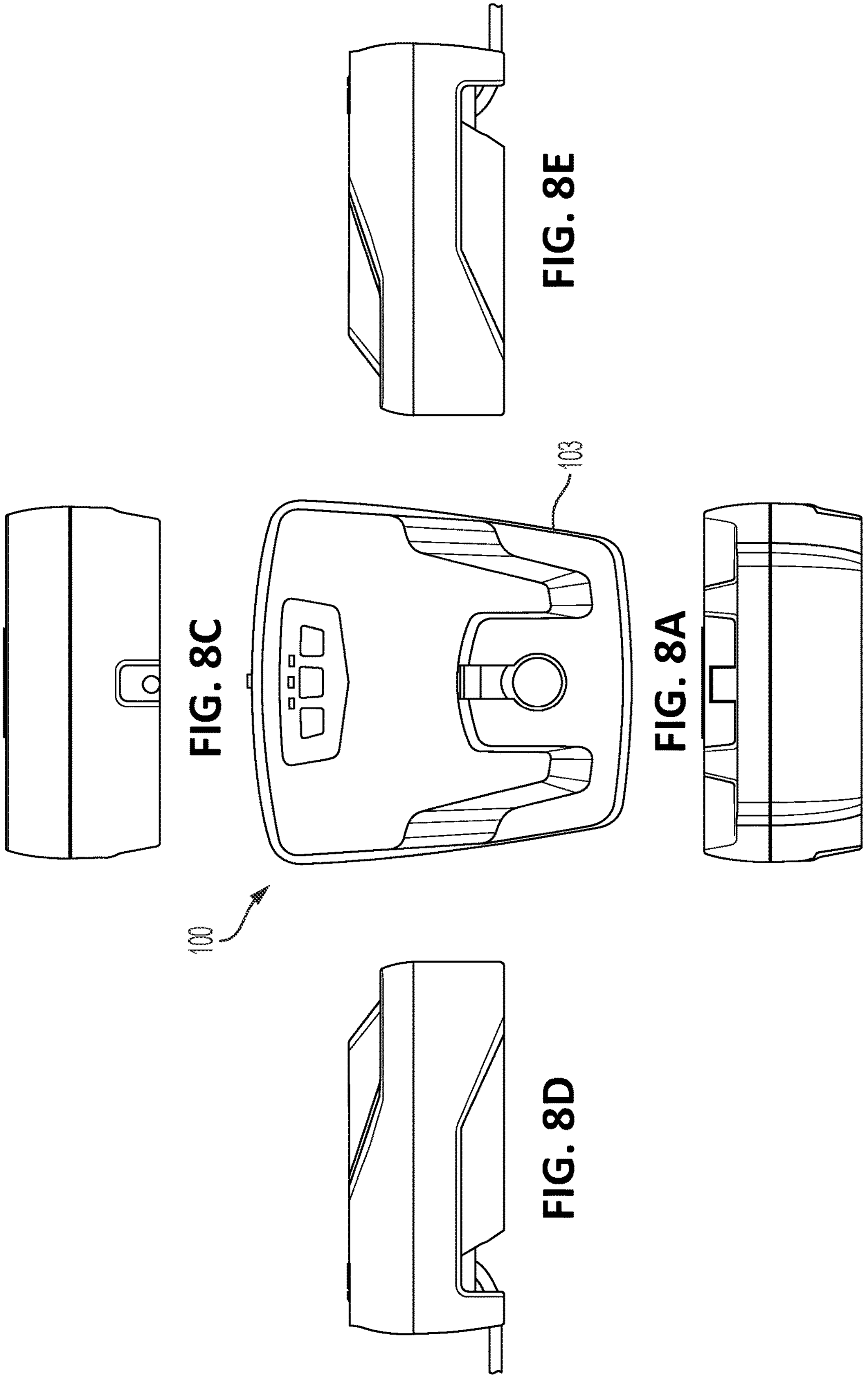
FIGS. 8A-E are top, front, rear, left, and right views of the portion of the magnetic detacher device of FIGS. 1A-B.

Referring FIGS. 4, 6A and 6B, in another alternative or additional aspect, the housing top portion 104 may additionally include a presence sensor 150 to detect presence of the gate 116 and/or the security tag 160 over the magnet opening 136, such as to determine if the gate 116 is being moved out of position without an authorized transaction 176 and/or to determine of the security tag 160 or other object is over the magnet opening 136 and thus it is not safe to move the gate 116 to the closed position. The presence sensor 150 may include any sensing mechanism able to detect gate 116, security tag 160, and/or another object such as a hand of a person. One suitable example of presence sensor 150 includes, but is not limited to, an infrared (IR) beam break sensor assembly 150, mounted on an IR beam break mount 152 (FIG. 4), configured to generate an IR beam 143 across the nest 112 (see FIG. 6A). The IR beam assembly 150 includes an IR beam transmitter 140 mounted in the wall 110 on one side of the nest 112, which transmits the IR beam, and an IR beam receiver 142 mounted in the wall 110 opposite the IR beam transmitter 140, which receives the IR beam 143. For example, the transmission of the IR beam 145 is positioned to blocked by the gate 116, the security tag 160, and/or any other object that is positioned in the nest 112 in a location which blocks the IR beam 143 from being received by the IR beam receiver 142. In these aspects, the processor 134 will monitor the status of whether the IR beam 143 is broken or received by the IR beam receiver 142. If the IR beam 143 is received but a transaction 176 has not been initiated or completed, then in some aspects the processor 134 may generate an alarm as this condition may mean that the gate 116 has been moved out of the closed position without authorization, and that the magnet opening 136 is currently exposed allowing the security tag 160 to be unlocked and removed from an article. As such, the IR beam assembly 150 combined with the processor 134 and/or actuator 130 monitoring the current threshold applied to hold the gate 116 in position provide two layers of security to ensure the gate 116 is not tampered with to allow for the unauthorized removal of security tags from articles. Additionally, the IR beam assembly 150 may determine whether an article, the security tag 160, and/or any other object, such as a hand of a person, are within the nest 112 for removal of the security tag 160 from the article. For example a transaction 176 may be approved or completed and the gate 116 is in the open position, and the IR beam assembly 150 will then determine that an object is in the nest 112 based on the IR beam 143 being broken, and in response the processor 134 may delay sending a command to close the gate 116. Once the IR beam assembly 150 detects that the IR beam 143 is received for a threshold period of time after the gate 116 has been opened, then the processor 134 determines that the nest 112 is clear and that it is safe to instruct the actuator 130 to move the gate 116 back to the closed position and await the next transaction 176.

Referring back to FIG. 4, in an alternative or additional aspect, the magnetic detacher 100 may include a radio frequency identifier (RFID) reader device 144. For example, the RFID reader device 144 may include an RFID module mounted on the circuit board 131 and configured to transmit an electromagnetic interrogation pulse and to receive a response message from the security tag 160 when positioned in the nest 112. The response message from a corresponding RFID module on the security tag 160 may include a specific identifier, which correlates to a specific item or article. The processor 134 and/or a corresponding transaction terminal 178 and/or transaction system 180 will then determine whether the identifier received in the response message corresponds to the identifier of an item in the transaction 176 associated with the unlock signal. If the identifier matches the identifier associated with the article 168, then the processor 134 will relay to the actuator 130 that the gate 116 can be moved from the closed position to the open position. If the identifier does not match the identifier, then the processor 134 will instruct the actuator 130 to maintain the gate 116 in the closed position until the correct identifier has been placed in the nest 112, and/or the processor 134 may generate the alarm. Additionally, in the event of multiple attempts to remove the security tag 160 from an incorrect article, based on the received identifier not matching the identifier of the item or article 168 involved in the transaction 176, the processor 134 may generate the alarm. This mechanism will prevent any attempt by a user to perform the transaction 176 for one article but then perform the removal of the security tag 160 from a different article, such as a sweet-hearting transaction and/or a transaction for a first relatively inexpensive article and an attempt to remove a security tag from a second relatively expensive article based on the transaction for the first article.

Referring back to FIGS. 1A-D, 2A-B, 3A, 4, and 5A-B, in some alternative or additional aspects, the housing 102 may further include a tag collector opening 146 sized to receive the security tag 160 after removal from the article 168. For example, in this aspect, the portion of the housing top portion 104 that includes the tag collector opening 146 may extend beyond a sidewall of the housing bottom portion 106. In this case, in one implementation, the magnetic detacher 100 may be mounted on a table top having a hole therein, wherein the tag collector opening 146 may be aligned over the hole in the table top. In another implementation, the magnetic detacher 100 may be mounted on a table top such that the portion of the housing top portion 104 that includes the tag collector opening 146 extends beyond an edge of the table top. In either case, a bag or bin may be positioned below the tag collector opening 146 to collect the unlocked security tags 160. The tag collector opening 146 is defined by a plurality of internal walls 145 at the end of the magnetic detacher 100 opposite the gate member 116, wherein the plurality of internal walls 145 may be defined in at least the housing top portion 104 and, optionally, in the housing bottom portion 106 (see FIG. 3). For instance, once the transaction 176 has been completed and the security tag 160 has been removed from the article 168, the security tag 160 can then be placed into the tag collector opening 146 to be reused on a different article. In some aspects, a user may drop the security tag 160 through the tag collector opening 146, while in other aspects, the gate 116 moving into the closed position may automatically push the security tag 160 into the tag collector opening 146. Thus, the tag collector opening 146 will allow the collection of security tags, and/or help prevent the inadvertent taking of security tags after a transaction, or the loss of security tags.

Referring to FIGS. 1A-B, 2A-B, 3A, and 4, in some alternative or additional aspects, the magnetic detacher 100 may include the key and/or indicator pad 148 mounted on the housing 102. The key and/or pad 148 may include one or more user interfaces, including one or more buttons be used for a variety of functions such as turning the magnetic detacher 100 on or off, or to reset the device in the event of a malfunction. Further, the one or more user interfaces may include one or more output devices, including an indicator light and/or a display, and/or a haptic feedback mechanism (such as a piezo electric device) configured to generate a vibration, etc., to identify a condition of state of the magnetic detacher 100, such as whether the magnetic detacher 100 is turned on or off, or is in a malfunction state, and/or that the transaction 176 has been approved or denied.

As mentioned above, the security system 190 including the magnetic detacher system 100 further includes the transaction terminal 178, also referred to as a transaction device, configured to perform the purchase transaction 176 for the article 168 to which a security tag 160 is attached. Once the transaction 176 has been completed, the transaction terminal 178 will relay a completed transaction signal to the processor 134, which in turn will relay to the actuator 130 a command that the gate 116 can be moved from the closed position to the open position. The processor 134 will further relay this information to the presence sensor 150, which triggers the presence sensor 150 to expect the gate 116 to be opened and the article 168 to be placed in the nest 112 and the security tag 160 to be unlocked, and to subsequently transmit the IR beam 143 to determine if it is safe to move the gate 116 to the closed position. The transaction terminal 178 may be a device directly attached to the magnetic detacher 100 or it may be a mobile device such as a mobile phone, which can connect to the magnetic detacher 100 using a wireless communication protocol such as Bluetooth, Wi-Fi, near field communication (NFC), and/or cellular communications.

Referring to FIGS. 7A-B and 8A-E, another example of the magnetic detacher 100 includes a housing 103 without the tag collector opening 146. In some cases, this implementation of the magnetic detacher 100 may be suitable for placement on top of a table or counter.

Referring to FIGS. 9 and 10A-D, and with reference back to FIG. 1D, in one implementation, a method 600 of operation of the magnetic detacher 100 includes various positions of the gate 116 corresponding to various states of the transaction 176 (FIG. 1D).

Figure 10A:
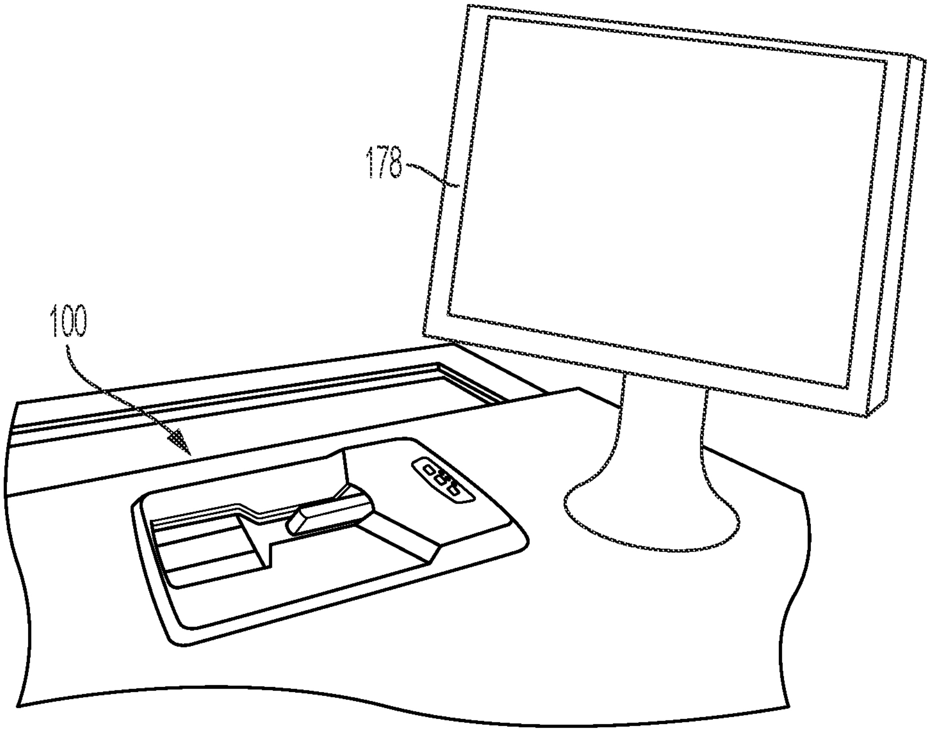
FIGS. 10A-D are schematic views of an example magnetic detacher and transaction terminal in the method of FIG. 9.

Initially, referring to FIG. 10A, before or at initiation of the transaction 176, the magnetic detacher 100 is in an idle mode with the gate 116 in the closed position.

Figure 9:
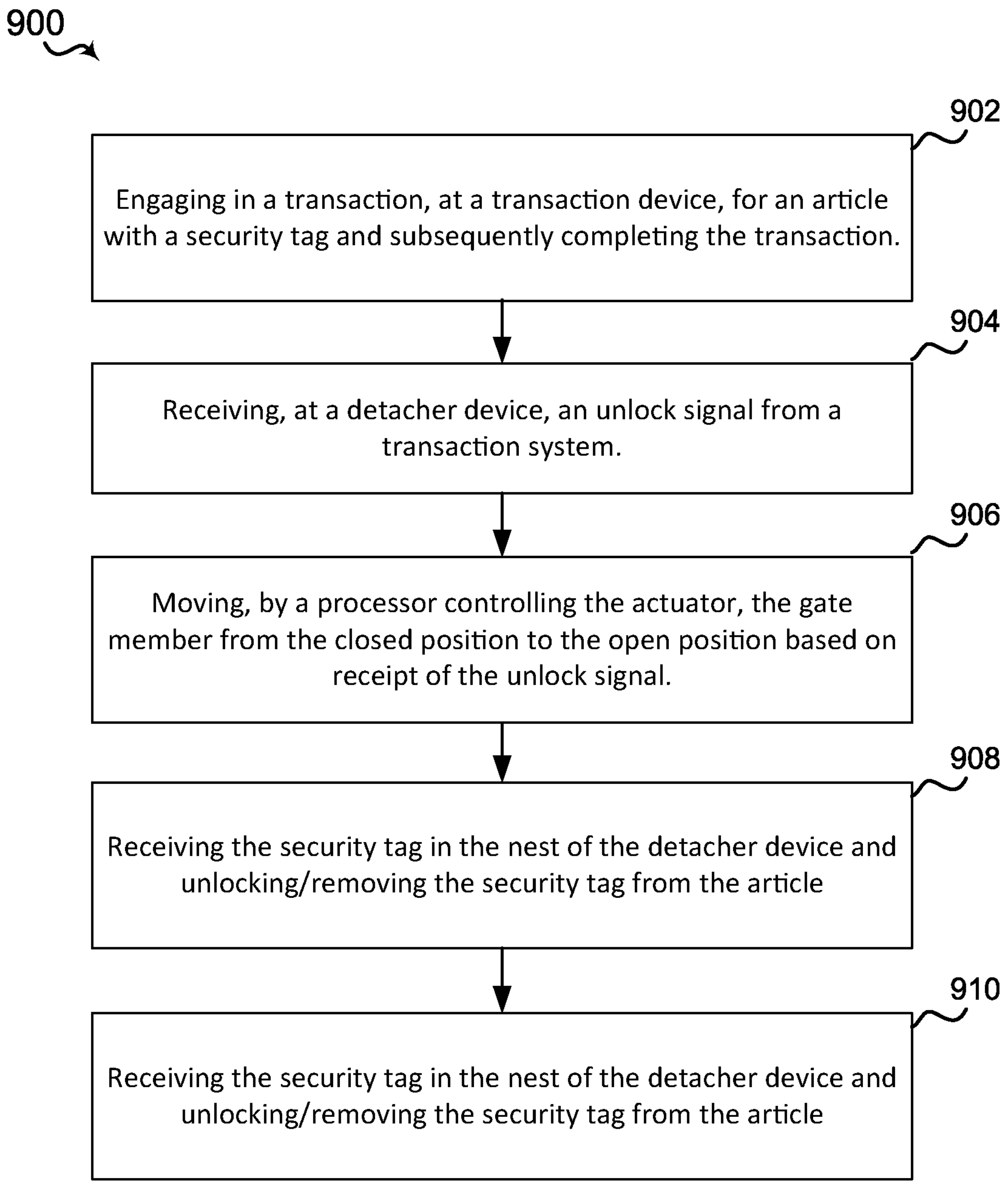
FIG. 9 is a flow diagram of an exemplary method of using a magnetic detacher device to unlock a security tag attached to an article.
Figure 10B:
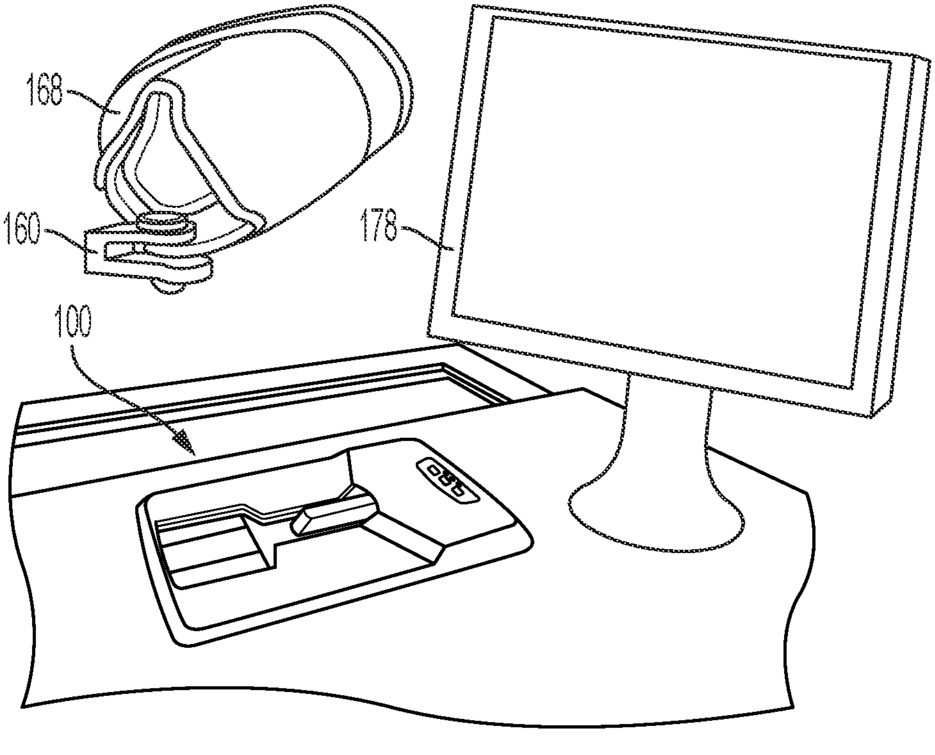

Referring to FIG. 10B, and at block 902 of FIG. 9, the method includes engaging in the transaction 176 for the article 168 at the transaction terminal 178, including completing the transaction 176. Further, and at block 904 of FIG. 9, the transaction terminal 178 will send, and the magnetic detacher 100 will receive, an unlock signal based on the completion of the transaction 176 and/or a confirmation of payment for the article 168. In some case, prior to or any time before receiving the unlock signal, the magnetic detacher 100 maintains the gate 116 in the closed position, and in some cases the additional security measures described above may be required. For example, if blocks 902 and/or 904 are not completed and there is an attempt to move gate 116 or if it is determined that an incorrect security tag 160 attached to an incorrect (e.g., not paid for) article 168 is entered into the nest 112, an alarm may be triggered or a notification may be displayed by the transaction terminal 178 indicating that the transaction 176 has not yet been completed. If the transaction 176 has been correctly completed and processor 134 determines that the identifier of the security tag 160 matches the identifier of the article in the transaction 176, then method 600 will move to block 906.

Figure 10C:
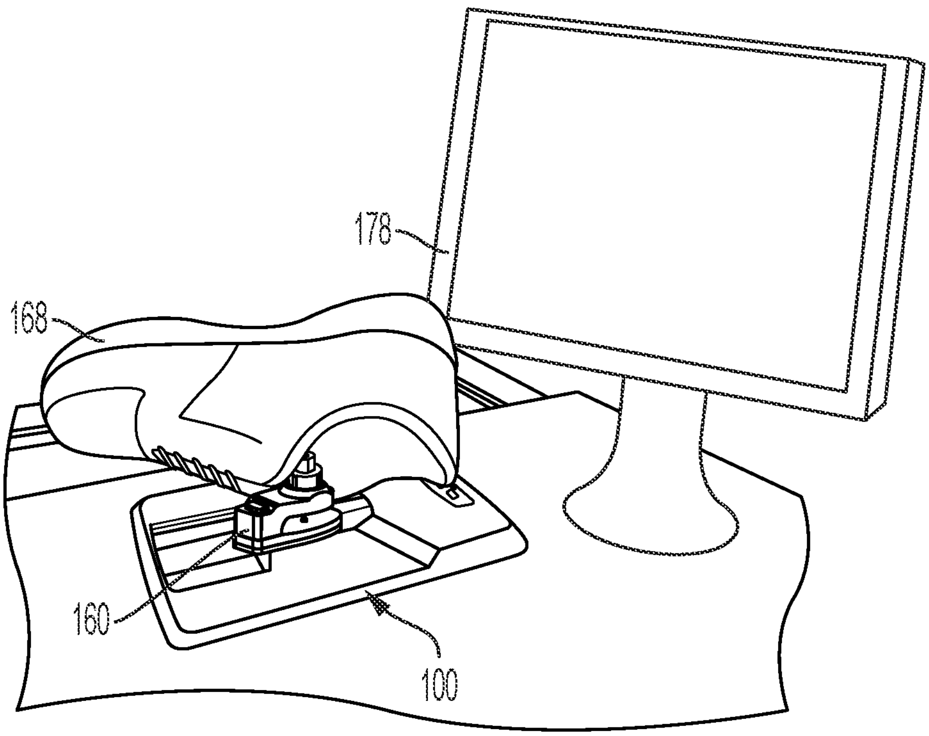

Referring to FIGS. 10B-C, and at block 906 of method 600, the processor 134 will instruct the actuator 130 (FIG. 4) to move the gate 116 from the closed position to the open position allowing the security tag 160 to access the nest 112 and the magnetic field of the magnet 130. Subsequently, and at block 908 of FIG. 9, once the gate 116 has moved to the open position, the security tag 160 locked onto the article 168 received into the nest 112, where the magnetic field of the magnet 138 acts on the magnetic lock 162 of the security tag 160 and enables unlocking and removing the security tag 160 from the article 168.

Figure 10D:
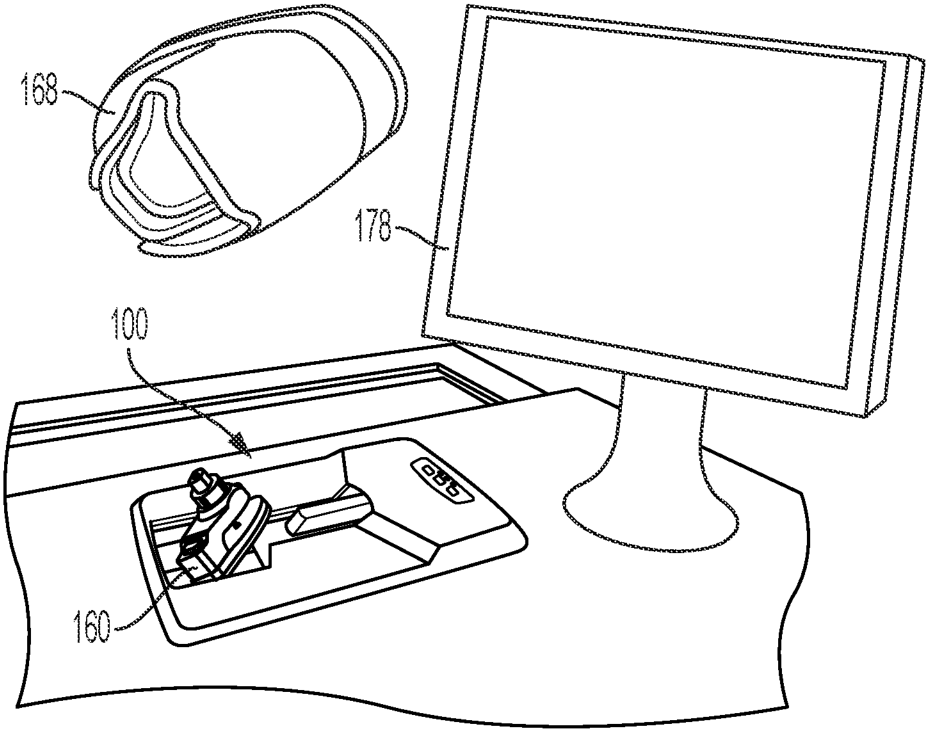

Additionally, referring to FIG. 10D and at block 910 of FIG. 9, in some cases as discussed above, the gate 116 may move back to the closed position to prevent the removal of additional security tags, and in some cases the gate 116 may move the security tag 160 from the nest 112 into the tag collector opening 146.

In some alternative aspects, the presence sensor 150 may determine when the article 168 has been removed from the nest 112, and/or when the nest 112 is clear of any obstructions, after the removal of the security tag 160 from the article 168, and may signal the processor 134 to trigger the gate 116 to move back to the closed position.

The method 600 may be performed for a single article or for multiple articles. In the event multiple articles are purchased the processor will determine whether the security tag of each article matches an identifier of one of the articles associated with the transaction. In an example scenario, the transaction will be completed for multiple articles. For the first article the gate will start in the closed position and the processor will determine whether the identifier associated with the article matches an identifier for the transaction. If the identifier matches an identifier associated with the transaction the gate will move from the closed position to the open position allowing for the security tag to be removed. The gate will then move back to the closed position and the process will then be repeated for each subsequent article until the security tags have been removed for each article associated with the transaction. Additionally, for each article, each of the security measures will remain in place to ensure the security tags for articles which have not been included in the transaction are not removed.

Figure 11:
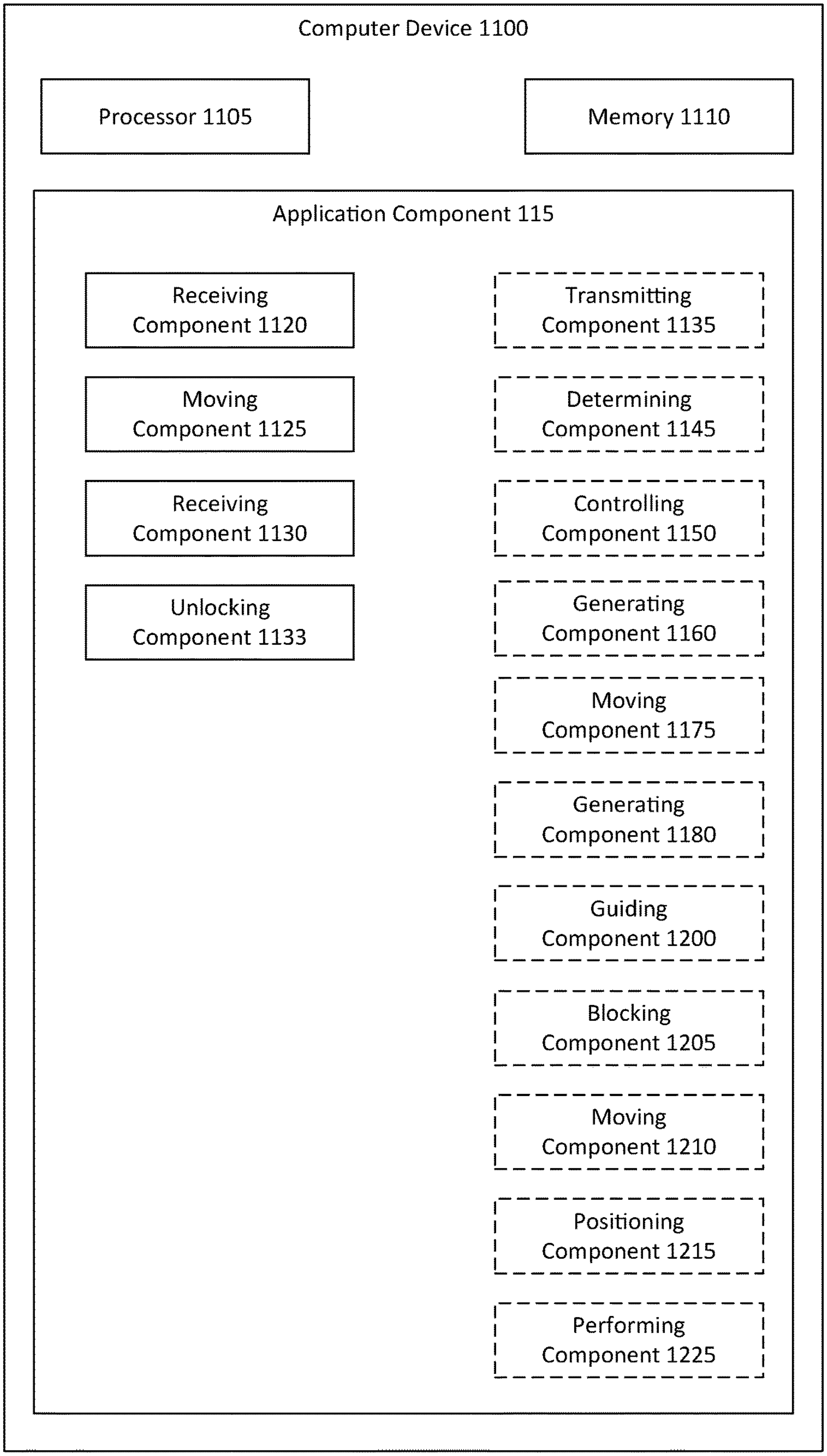
FIG. 11 is a block diagram of an example architecture of a computer device configured to perform the methods of FIGS. 12 to 22.
Figure 12:
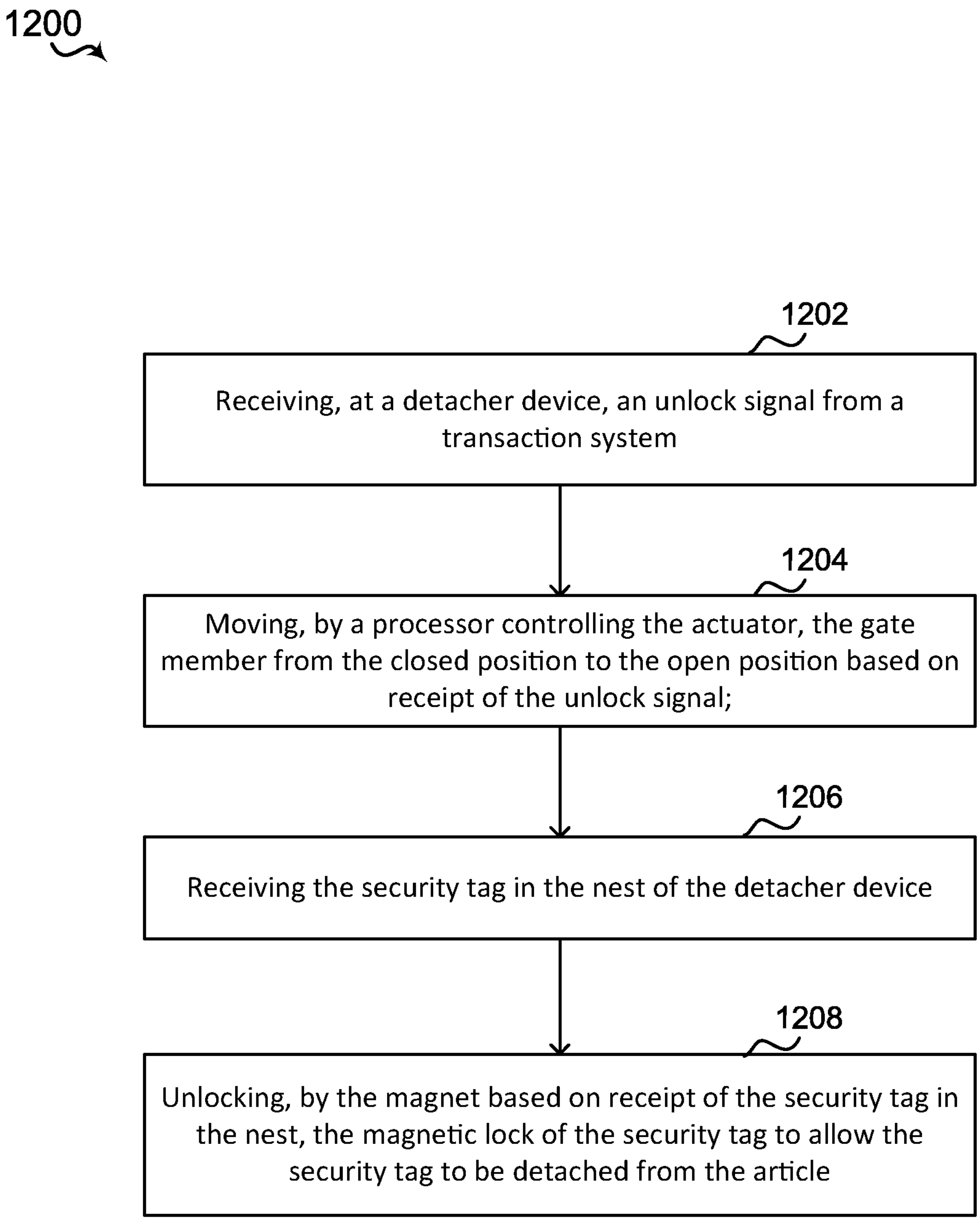
FIG. 12 is a flow diagram of another exemplary method of using a magnetic detacher device to unlock a security tag attached to an article.

Referring to FIG. 11 and FIG. 12, in another alternative method of operation, computer device 1100 may perform a method 1200 of detaching a security tag from an article, by such as via execution of security tag detacher component 1115 by processor 1105 and/or memory 1110. In this case, computer device 1100 may include the magnetic detacher 100, and/or a combination of the magnetic detacher 100 and the transaction terminal 178.

At block 1202, the method 1200 includes receiving, at a detacher device, an unlock signal from a transaction system, wherein the detacher device includes: a housing having at least one wall that defines a nest configured to receive a security tag; a gate assembly including a gate member and an actuator, wherein the actuator is configured to move the gate member between a closed position and an open position, wherein the gate member in the closed position blocks the nest, and wherein the gate member in the open position allows access to the nest a magnet positioned on an opposite side of the housing relative to the nest and adjacent to the nest, wherein the magnet has a magnetic flux in an area of the nest sufficient to unlock a magnetic lock of the security tag. For example, in an aspect, computer device 1100, processor 1105, memory 1110, security tag detacher component 1115, and/or receiving component 1120 may be configured to or may comprise means for receiving, at a detacher device, an unlock signal from a transaction system. In this discussion, the detacher device may be the magnetic detacher 100, the gate member may be gate 116, the next may be nest 112, the magnet may be magnet 138, the security tag may be security tag 160 locked onto article 168, the transaction system may be the transaction terminal 178 and/or the security system 180, and the unlock signal may be based on performing transaction 176.

At block 1204, the method 1200 includes moving, by a processor controlling the actuator, the gate member from the closed position to the open position based on receipt of the unlock signal. For example, in an aspect, computer device 1100, processor 1105, memory 1110, security tag detacher component 1115, and/or moving component 1125 may be configured to or may comprise means for moving, by a processor controlling the actuator, the gate member from the closed position to the open position based on receipt of the unlock signal. In the case, the processor may be processor 134, the actuator may be actuator 130, and the gate member may be gate 116.

At block 1206, the method 1200 includes receiving the security tag in the nest of the detacher device. For example, in an aspect, computer device 1100, processor 1105, memory 1110, security tag detacher component 1115, and/or receiving component 1130 may be configured to or may comprise means for receiving the security tag in the nest of the detacher device.

At block 1208, the method 1200 includes unlocking, by the magnet based on receipt of the security tag in the nest, the magnetic lock of the security tag to allow the security tag to be detached from the article. For example, in an aspect, computer device 1100, processor 1105, memory 1110, security tag detacher component 1115, and/or unlocking component 1133 may be configured to or may comprise means for unlocking, by the magnet based on receipt of the security tag in the nest, the magnetic lock of the security tag to allow the security tag to be detached from the article.

For example, the unlocking at block 1208 may include the magnetic field of the magnet 138 unlocking the magnetic lock 162 of the security tag 160.

Figure 13:
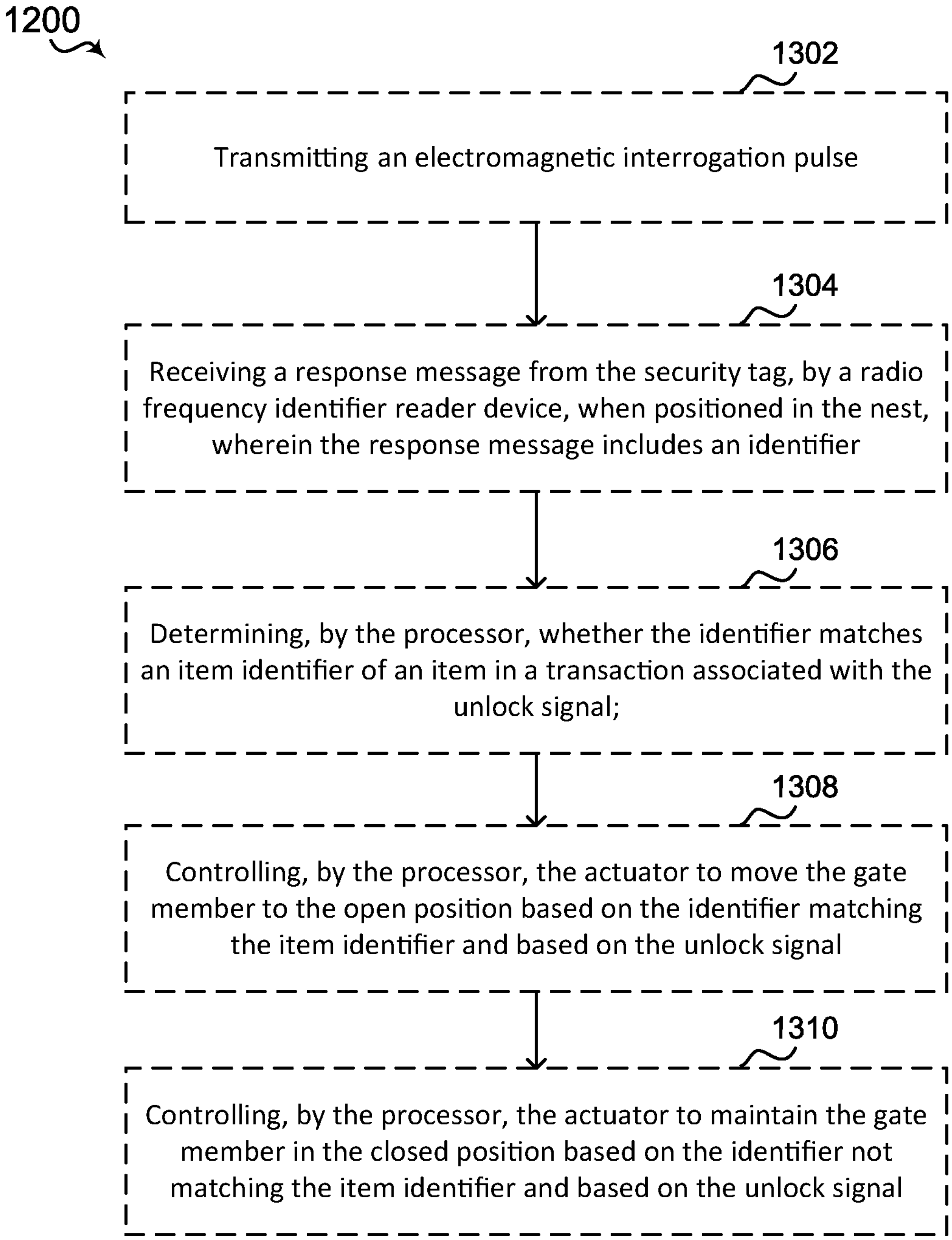
FIGS. 13-22 are flow diagrams of additional aspects related to the method of FIG. 12.

Referring to FIG. 13, in an optional aspect, at block 1302, the method 1200 may further include transmitting an electromagnetic interrogation pulse. For example, in an aspect, computer device 1100, processor 1105, memory 1110, security tag detacher component 1115, and/or transmitting component 1135 may be configured to or may comprise means for transmitting an electromagnetic interrogation pulse.

For example, the transmitting at block 1302 may include transmitting the interrogation pulse in order to identify the security tag to determine if it matches an identity of a security tag attached to an article in the transaction 176.

In this optional aspect, at block 1304, the method 1200 may further include receiving a response message from the security tag, by a radio frequency identifier reader device, when positioned in the nest, wherein the response message includes an identifier. For example, in an aspect, computer device 1100, processor 1105, memory 1110, security tag detacher component 1115, and/or receiving component 1120 may be configured to or may comprise means for receiving a response message from the security tag, by a radio frequency identifier reader device, when positioned in the nest, wherein the response message includes an identifier.

In this optional aspect, at block 1306, the method 1200 may further include determining, by the processor, whether the identifier matches an item identifier of an item in a transaction associated with the unlock signal. For example, in an aspect, computer device 1100, processor 1105, memory 1110, security tag detacher component 1115, and/or determining component 1145 may be configured to or may comprise means for determining, by the processor, whether the identifier matches an item identifier of an item in a transaction associated with the unlock signal.

In this optional aspect, at block 1308, the method 1200 may further include controlling, by the processor, the actuator to move the gate member to the open position based on the identifier matching the item identifier and based on the unlock signal. For example, in an aspect, computer device 1100, processor 1105, memory 1110, security tag detacher component 1115, and/or controlling component 1150 may be configured to or may comprise means for controlling, by the processor, the actuator to move the gate member to the open position based on the identifier matching the item identifier and based on the unlock signal.

In this optional aspect, at block 1310, the method 1200 may further include controlling, by the processor, the actuator to maintain the gate member in the closed position based on the identifier not matching the item identifier and based on the unlock signal. For example, in an aspect, computer device 1100, processor 1105, memory 1110, security tag detacher component 1115, and/or controlling component 1150 may be configured to or may comprise means for controlling, by the processor, the actuator to maintain the gate member in the closed position based on the identifier not matching the item identifier and based on the unlock signal.

Figure 14:
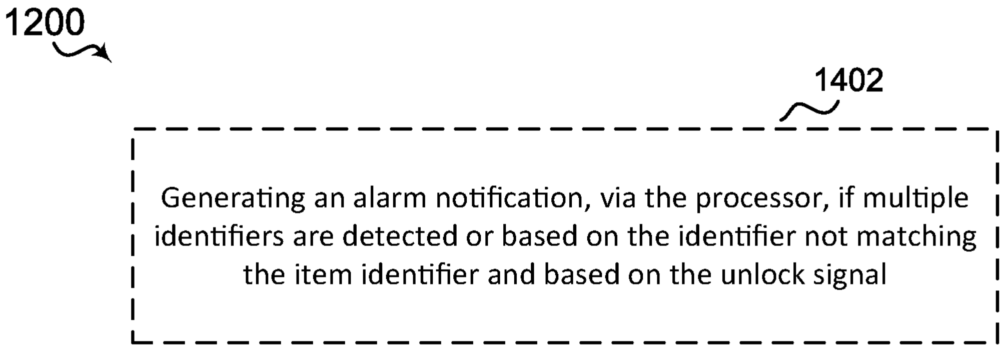

Referring to FIG. 14, in an optional aspect, at block 1402, the method 1200 may further include generating an alarm notification, via the processor, if multiple identifiers are detected or based on the identifier not matching the item identifier and based on the unlock signal. For example, in an aspect, computer device 1100, processor 1105, memory 1110, security tag detacher component 1115, and/or generating component 1160 may be configured to or may comprise means for generating an alarm notification, via the processor, if multiple identifiers are detected or based on the identifier not matching the item identifier and based on the unlock signal.

Figure 15:
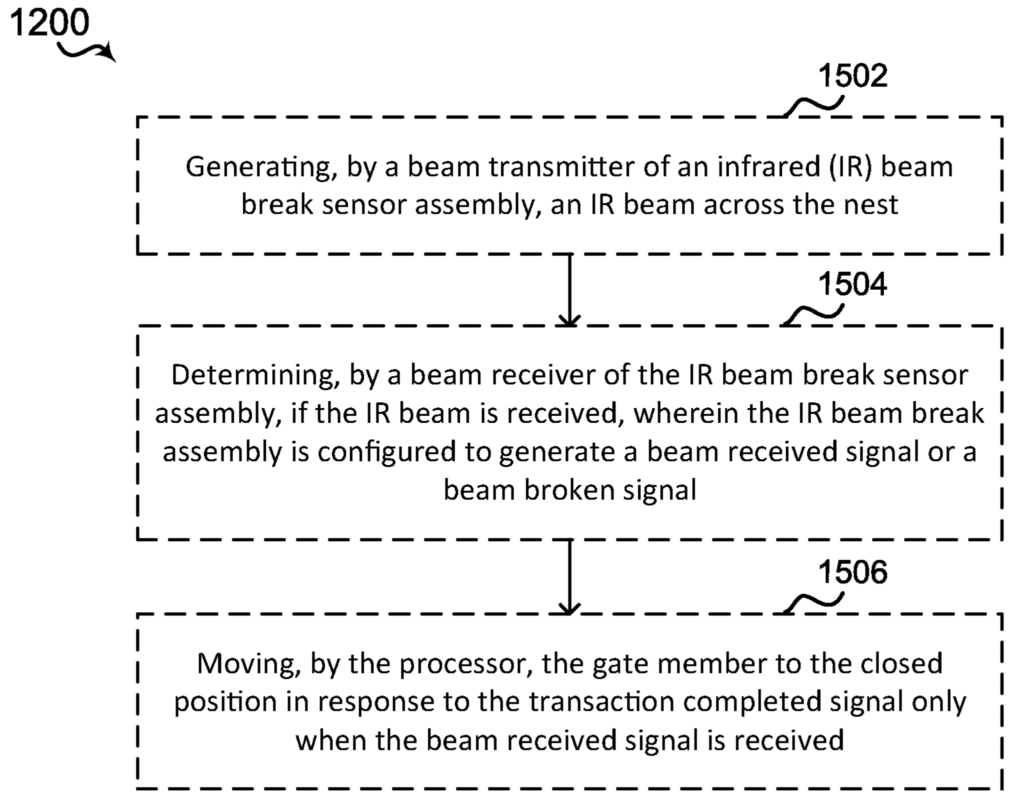

Referring to FIG. 15, in an optional aspect, at block 1502, the method 1200 may further include generating, by a beam transmitter of an infrared (IR) beam break sensor assembly, an IR beam across the nest. For example, in an aspect, computer device 1100, processor 1105, memory 1110, security tag detacher component 1115, and/or generating component 1160 may be configured to or may comprise means for generating, by a beam transmitter of an infrared (IR) beam break sensor assembly, an IR beam across the nest.

For example, the generating at block 1502 may be utilized to determine if it is safe to move the gate 116 to the closed position.

In this optional aspect, at block 1504, the method 1200 may further include determining, by a beam receiver of the IR beam break sensor assembly, if the IR beam is received, wherein the IR beam break assembly is configured to generate a beam received signal or a beam broken signal. For example, in an aspect, computer device 1100, processor 1105, memory 1110, security tag detacher component 1115, and/or determining component 1145 may be configured to or may comprise means for determining, by a beam receiver of the IR beam break sensor assembly, if the IR beam is received, wherein the IR beam break assembly is configured to generate a beam received signal or a beam broken signal.

In this optional aspect, at block 1506, the method 1200 may further include moving, by the processor, the gate member to the closed position in response to the transaction completed signal only when the beam received signal is received. For example, in an aspect, computer device 1100, processor 1105, memory 1110, security tag detacher component 1115, and/or moving component 1175 may be configured to or may comprise means for moving, by the processor, the gate member to the closed position in response to the transaction completed signal only when the beam received signal is received.

Figure 16:
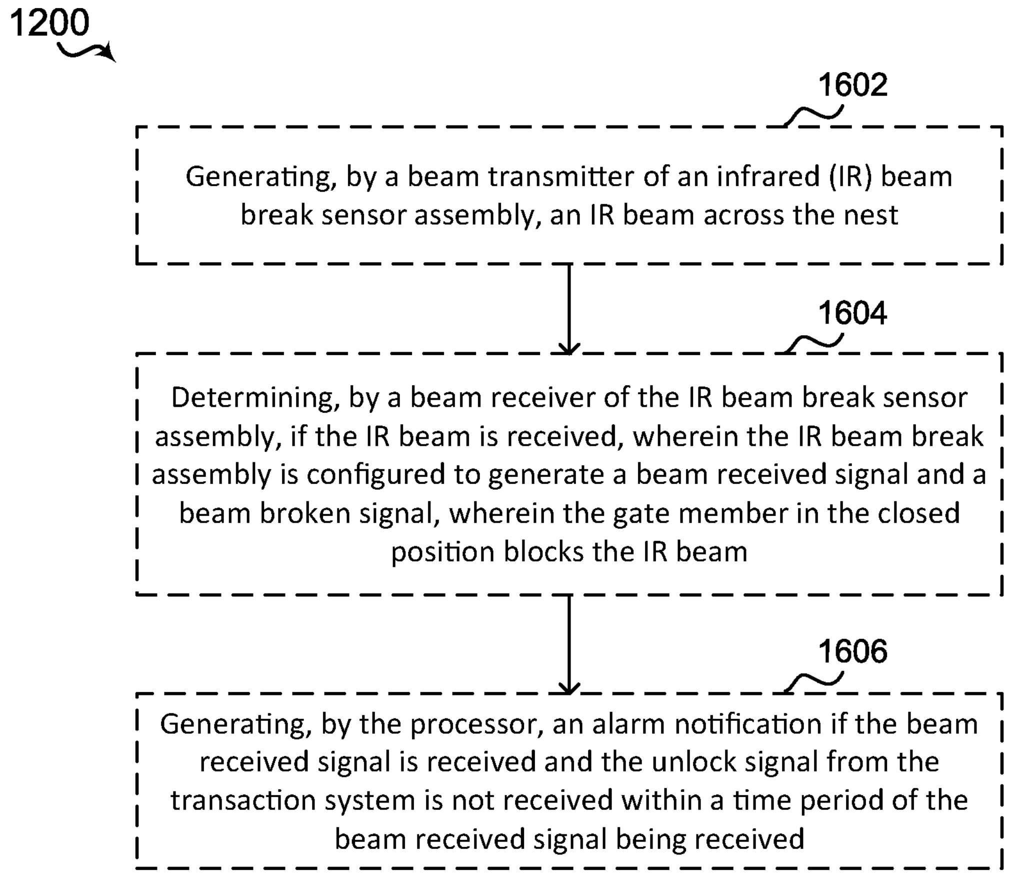

Referring to FIG. 16, in an optional aspect, at block 1602, the method 1200 may further include generating, by a beam transmitter of an infrared (IR) beam break sensor assembly, an IR beam across the nest. For example, in an aspect, computer device 1100, processor 1105, memory 1110, security tag detacher component 1115, and/or generating component 1180 may be configured to or may comprise means for generating, by a beam transmitter of an infrared (IR) beam break sensor assembly, an IR beam across the nest.

In this optional aspect, at block 1604, the method 1200 may further include determining, by a beam receiver of the IR beam break sensor assembly, if the IR beam is received, wherein the IR beam break assembly is configured to generate a beam received signal and a beam broken signal, wherein the gate member in the closed position blocks the IR beam. For example, in an aspect, computer device 1100, processor 1105, memory 1110, security tag detacher component 1115, and/or determining component 1145 may be configured to or may comprise means for determining, by a beam receiver of the IR beam break sensor assembly, if the IR beam is received, wherein the IR beam break assembly is configured to generate a beam received signal and a beam broken signal, wherein the gate member in the closed position blocks the IR beam.

In this optional aspect, at block 1606, the method 1200 may further include generating, by the processor, an alarm notification if the beam received signal is received and the unlock signal from the transaction system is not received within a time period of the beam received signal being received. For example, in an aspect, computer device 1100, processor 1105, memory 1110, security tag detacher component 1115, and/or generating component 1180 may be configured to or may comprise means for generating, by the processor, an alarm notification if the beam received signal is received and the unlock signal from the transaction system is not received within a time period of the beam received signal being received.

Figure 17:
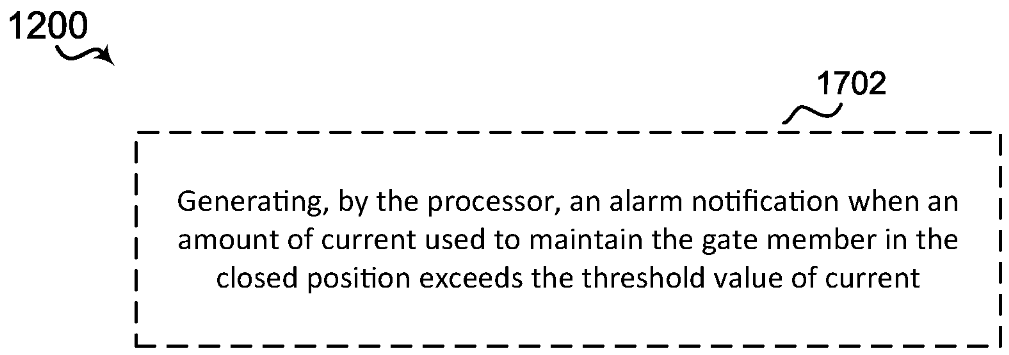

Referring to FIG. 17, in an optional aspect wherein the actuator uses a threshold value of current to maintain the gate member in the closed position, at block 1702, the method 1200 may further include generating, by the processor, an alarm notification when an amount of current used to maintain the gate member in the closed position exceeds the threshold value of current. For example, in an aspect, computer device 1100, processor 1105, memory 1110, security tag detacher component 1115, and/or generating component 1180 may be configured to or may comprise means for generating, by the processor, an alarm notification when an amount of current used to maintain the gate member in the closed position exceeds the threshold value of current.

Figure 18:
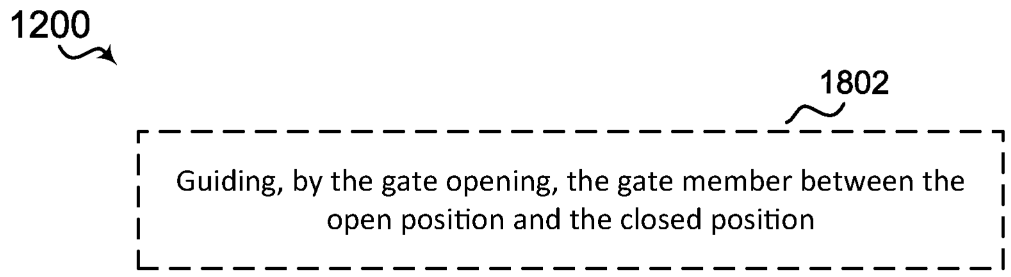

Referring to FIG. 18, in an optional aspect wherein the device housing further includes a top portion having a raised portion at one end of the device housing top portion, wherein the raised portion further includes a plurality of internal walls defining a gate opening, at block 1802, the method 1200 may further include guiding, by the gate opening, the gate member between the open position and the closed position. For example, in an aspect, computer device 1100, processor 1105, memory 1110, security tag detacher component 1115, and/or guiding component 1200 may be configured to or may comprise means for guiding, by the gate opening, the gate member between the open position and the closed position.

Figure 19:
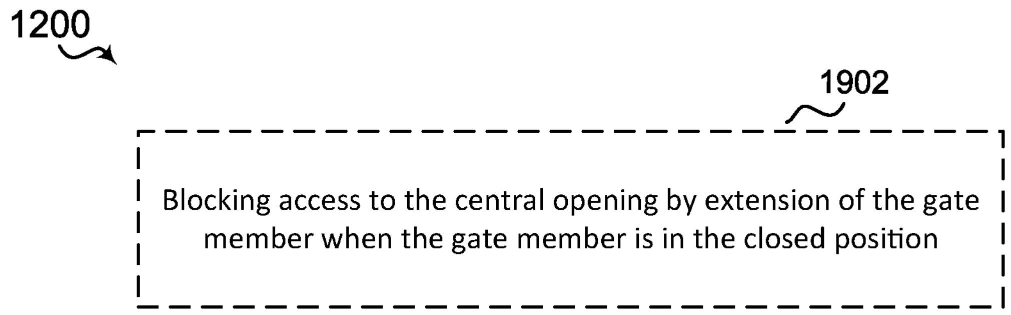

Referring to FIG. 19, in an optional aspect wherein the housing includes a device housing top portion having a central internal wall defining a central opening adjacent to the magnet, at block 1902, the method 1200 may further include blocking access to the central opening by extension of the gate member when the gate member is in the closed position. For example, in an aspect, computer device 1100, processor 1105, memory 1110, security tag detacher component 1115, and/or blocking component 1205 may be configured to or may comprise means for blocking access to the central opening by extension of the gate member when the gate member is in the closed position.

In an aspect, the housing includes a device housing top portion having a plurality of internal walls at an end of the device housing top portion opposite the gate member, wherein the plurality of internal walls define a tag collector opening sized to receive the security tag.

Figure 20:
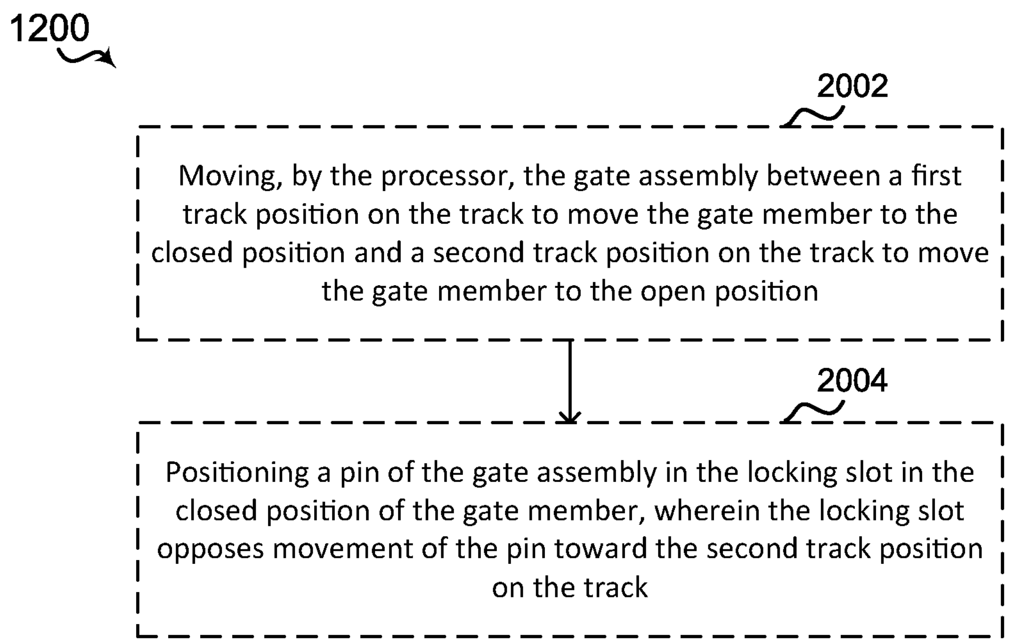

Referring to FIG. 20, in an optional aspect wherein the gate assembly includes a plate having an internal wall defining a track, at block 2002, the method 1200 may further include moving, by the processor, the gate assembly between a first track position on the track to move the gate member to the closed position and a second track position on the track to move the gate member to the open position. For example, in an aspect, computer device 1100, processor 1105, memory 1110, security tag detacher component 1115, and/or moving component 1210 may be configured to or may comprise means for moving, by the processor, the gate assembly between a first track position on the track to move the gate member to the closed position and a second track position on the track to move the gate member to the open position.

In this optional aspect and wherein the track further comprises a locking slot extending transverse to the track, at block 2004, the method 1200 may further include positioning a pin of the gate assembly in the locking slot in the closed position of the gate member, wherein the locking slot opposes movement of the pin toward the second track position on the track. For example, in an aspect, computer device 1100, processor 1105, memory 1110, security tag detacher component 1115, and/or positioning component 1215 may be configured to or may comprise means for positioning a pin of the gate assembly in the locking slot in the closed position of the gate member, wherein the locking slot opposes movement of the pin toward the second track position on the track.

Figure 21:
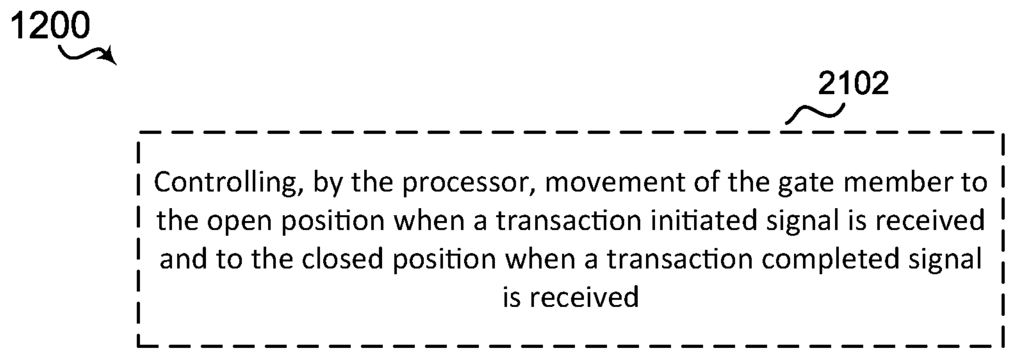

Referring to FIG. 21, in an optional aspect, at block 2102, the method 1200 may further include controlling, by the processor, movement of the gate member to the open position when a transaction initiated signal is received and to the closed position when a transaction completed signal is received. For example, in an aspect, computer device 1100, processor 1105, memory 1110, security tag detacher component 1115, and/or generating component 1150 may be configured to or may comprise means for controlling, by the processor, movement of the gate member to the open position when a transaction initiated signal is received and to the closed position when a transaction completed signal is received.

Figure 22:
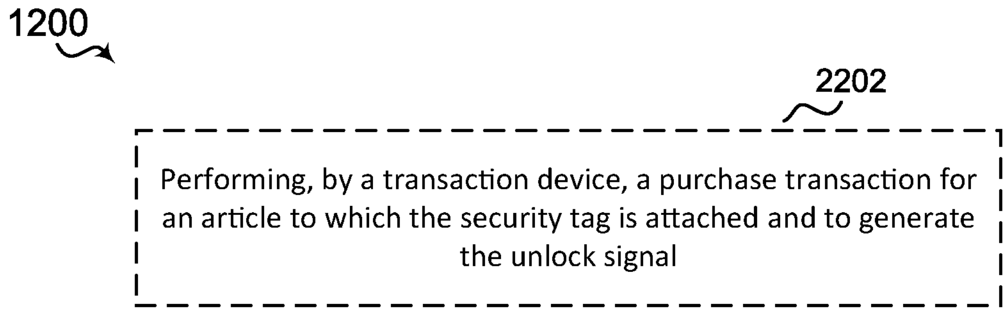

Referring to FIG. 22, in an optional aspect, at block 2202, the method 1200 may further include performing, by a transaction device, a purchase transaction for an article to which the security tag is attached and to generate the unlock signal. For example, in an aspect, computer device 1100, processor 1105, memory 1110, security tag detacher component 1115, and/or performing component 1225 may be configured to or may comprise means for performing, by a transaction device, a purchase transaction for an article to which the security tag is attached and to generate the unlock signal.

In an aspect, the transaction device comprises a point of sale terminal or a mobile device.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method of detaching a security tag from an article, comprising:

receiving, at a detacher device, an unlock signal from a transaction system, wherein the detacher device includes:

a housing having at least one wall that defines a nest configured to receive the security tag;

a gate assembly including a gate member and an actuator, wherein the actuator is configured to move the gate member between a closed position and an open position, wherein the gate member in the closed position blocks the nest preventing unlocking of the security tag, and wherein the gate member in the open position allows access to the nest and the unlocking of the security tag; and a magnet positioned on an opposite side of the housing below the nest, wherein the magnet has a flux in an area of the nest sufficient to unlock a magnetic lock of the security tag in response to a portion of the security tag being placed adjacent to or within the nest;

moving, by a processor controlling the actuator, the gate member from the closed position to the open position based on receipt of the unlock signal;

receiving the security tag in the nest of the detacher device; and unlocking, by the magnet based on receipt of the security tag in the nest, the magnetic lock of the security tag to allow the security tag to be detached from the article.

2. The method of claim 1, further comprising:

transmitting an electromagnetic interrogation pulse;

receiving a response message from the security tag, by a radio frequency identifier reader device, when positioned in the nest, wherein the response message includes an identifier;

determining, by the processor, whether the identifier matches an item identifier of an item in a transaction associated with the unlock signal;

controlling, by the processor, the actuator to move the gate member to the open position based on the identifier matching the item identifier and based on the unlock signal; and controlling, by the processor, the actuator to maintain the gate member in the closed position based on the identifier not matching the item identifier and based on the unlock signal.

3. The method of claim 2, further comprising:

generating an alarm notification, via the processor, if multiple identifiers are detected or based on the identifier not matching the item identifier and based on the unlock signal.

4. The method of claim 1, further comprising:

generating, by a beam transmitter of an infrared (IR) beam break sensor assembly, an IR beam across the nest;

determining, by a beam receiver of the IR beam break sensor assembly, if the IR beam is received, wherein the IR beam break sensor assembly is configured to generate a beam received signal or a beam broken signal; and moving, by the processor controlling the actuator, the gate member to the closed position in response to a transaction completed signal only when the beam received signal is received.

5. The method of claim 1, further comprising:

generating, by a beam transmitter of an infrared (IR) beam break sensor assembly, an IR beam across the nest, determining, by a beam receiver of the IR beam break sensor if the IR beam is received, wherein the IR beam break assembly is configured to generate a beam received signal and a beam broken signal, wherein the gate member in the closed position blocks the IR beam; and generating, by the processor, an alarm notification if the beam received signal is received and the unlock signal from the transaction is not received within a time period of the beam received signal being received.

6. The method of claim 1, wherein the actuator uses a threshold value of current to maintain the gate member in the closed position, and further comprising:

generating, by the processor, an alarm notification when an amount of current used to maintain the gate member in the closed position exceeds the threshold value of current.

7. The method of claim 1, wherein the device housing further includes a top portion having a raised portion at one end of the device housing top portion, wherein the raised portion further includes a plurality of internal walls defining a gate opening, and further comprising:

guiding, by the gate opening, the gate member between the open position and the closed position.

8. The method of claim 1, wherein the housing includes a device housing top portion having a central internal wall defining a central opening adjacent to the magnet, wherein the central opening is sized to receive at least a part of the security tag, and further comprising:

blocking the access to the central opening by extension of the gate member when the gate member is in the closed position.

9. The method of claim 1, wherein the housing includes a device housing top portion having a plurality of internal walls at an end of the device housing top portion opposite the gate member, wherein the plurality of internal walls define a tag collector opening sized to receive the security tag.

10. The method of claim 1, wherein the gate assembly includes a plate having an internal wall defining a track, and further comprising:

moving, by the processor, the gate assembly between a first track position on the track to move the gate member to the closed position and a second track position on the track to move the gate member to the open position.

11. The method of claim 10, wherein the track further comprises a locking slot extending transverse to the track, and further comprising:

positioning a pin of the gate assembly in the locking slot in the closed position of the gate member, wherein the locking slot opposes movement of the pin toward the second track position on the track.

12. The method of claim 1, further comprising:

controlling, by the processor, movement of the gate member to the open position when a transaction initiated signal is received and to the closed position when a transaction completed signal is received.

13. The method of claim 1, further comprising:

performing, by a transaction device, a purchase transaction for the article to which the security tag is attached and to generate the unlock signal.

14. The method of claim 13, wherein the transaction device comprises a point of sale terminal or a mobile device.

15. The method of claim 1, wherein the gate member extends from a gate opening in the at least one wall when in the closed position.

16. The method of claim 1, wherein the gate member covers at least a part of the nest when in the closed position.

17. The method of claim 1, wherein the gate member extends from a gate opening in the at least one wall and covers at least a part of the nest when in the closed position.

* * * * *